US012615667B2

(12) United States Patent
Chisci et al.

(10) Patent No.: US 12,615,667 B2
(45) Date of Patent: Apr. 28, 2026

(54) RECEIVE ASSISTED LISTEN BEFORE TALK WITH MULTIPLE CANDIDATE BEAMS AND WAVEFORM AS SINGLE ACKNOWLEDGMENT OF PRE-GRANT

(71) Applicant: QUALCOMM Incorporated, San Diego, CA (US)

(72) Inventors: Giovanni Chisci, San Diego, CA (US); Arumugam Chendamarai Kannan, San Diego, CA (US); Siyi Chen, Beijing (CN); Vinay Chande, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/279,897

(22) PCT Filed: Apr. 12, 2021

(86) PCT No.: PCT/CN2021/086523
§ 371 (c)(1),
(2) Date: Sep. 1, 2023

(87) PCT Pub. No.: WO2022/217411
PCT Pub. Date: Oct. 20, 2022

(65) Prior Publication Data
US 2024/0155680 A1 May 9, 2024

(51) Int. Cl.
*H04W 74/00* (2009.01)
*H04B 7/06* (2006.01)
(Continued)

(52) U.S. Cl.
CPC ...... *H04W 74/0816* (2013.01); *H04B 7/0626* (2013.01); *H04L 1/0003* (2013.01); *H04L 5/0051* (2013.01); *H04W 74/006* (2013.01)

(58) Field of Classification Search
CPC ............ H04W 74/0816; H04W 74/006; H04B 7/0626; H04L 1/0003; H04L 5/0051
See application file for complete search history.

(56) References Cited

U.S. PATENT DOCUMENTS

| | | | | | |
|---|---|---|---|---|---|
| 2018/0146506 A1* | 5/2018 | Zhang | .................. | H04W 56/001 |
| 2018/0375545 A1* | 12/2018 | Fan | .......................... | H04L 7/06 |

(Continued)

FOREIGN PATENT DOCUMENTS

| | | |
|---|---|---|
| CN | 103650364 A | 3/2014 |
| CN | 109314552 A | 2/2019 |
| WO | 2016204811 A1 | 12/2016 |

OTHER PUBLICATIONS

International Search Report and Written Opinion—PCT/CN2021/086523—ISA/EPO—Jan. 17, 2022.

*Primary Examiner* — Fahmida S Chowdhury
(74) *Attorney, Agent, or Firm* — ArentF ox Schiff, LLP and Qualcomm, Incorporated

(57) ABSTRACT

This disclosure provides systems, methods and apparatus, including computer programs encoded on computer storage media, for a user equipment (UE) to provide listen before talk (LBT) assistance to a transmitting device. The UE may receive a pre-grant (PG) indicating a plurality of beams. The UE may performing a LBT procedure on each beam of the indicated plurality of beams. The UE may transmit an acknowledgment to the pre-grant (APG) as a waveform that indicates that the LBT procedure for one or more of the indicated plurality of beams was successful. The waveform (Continued)

may be a sounding reference signal (SRS) with a sequence that indicates that the LBT procedure was successful.

18 Claims, 10 Drawing Sheets

(51) Int. Cl.

| | | |
|---|---|---|
| *H04L 1/00* | (2006.01) | |
| *H04L 5/00* | (2006.01) | |
| *H04W 74/0816* | (2024.01) | |

(56) References Cited

U.S. PATENT DOCUMENTS

| | | | | |
|---|---|---|---|---|
| 2019/0090279 A1* | 3/2019 | Sun | .................... | H04W 74/0816 |
| 2019/0159253 A1* | 5/2019 | Koorapaty | ........ | H04W 74/0808 |
| 2019/0181921 A1* | 6/2019 | Lee | ......................... | H04B 7/063 |
| 2019/0181934 A1* | 6/2019 | Kang | .................... | H04W 72/20 |
| 2019/0357255 A1* | 11/2019 | Sun | ........................ | H04L 5/0062 |
| 2021/0068154 A1* | 3/2021 | Jia | ........................ | H04W 74/002 |
| 2021/0176094 A1* | 6/2021 | Kang | .................... | H04L 5/0051 |
| 2021/0299879 A1* | 9/2021 | Pinter | .................... | B25J 9/1697 |
| 2021/0410187 A1* | 12/2021 | Yang | .................... | H04W 16/28 |
| 2022/0124806 A1* | 4/2022 | Hu | ........................ | H04W 16/28 |
| 2022/0377810 A1* | 11/2022 | Bhamri | ................ | H04B 7/0695 |
| 2024/0155680 A1* | 5/2024 | Chisci | .................. | H04L 1/0003 |

* cited by examiner

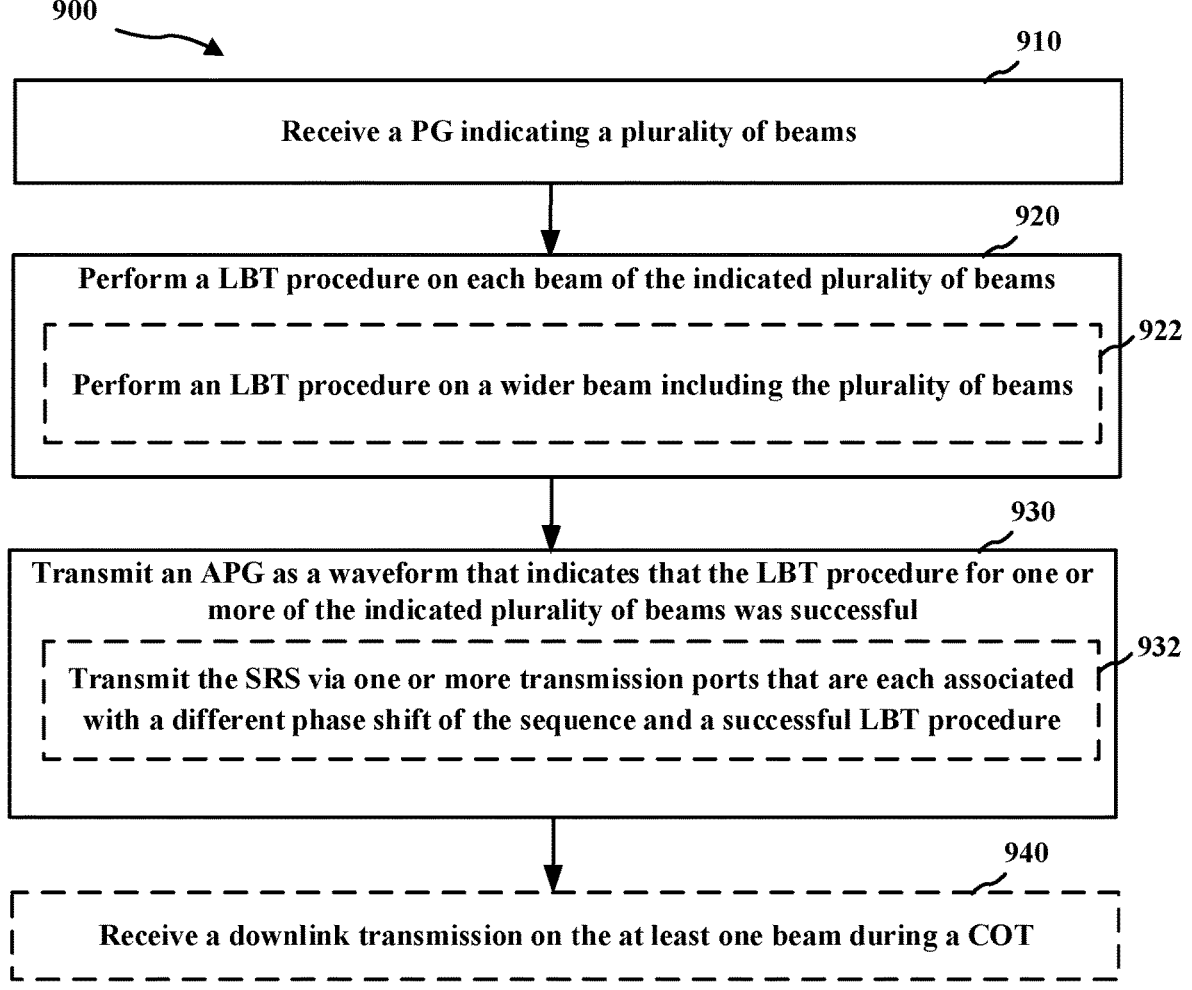

900

910

Receive a PG indicating a plurality of beams

920

Perform a LBT procedure on each beam of the indicated plurality of beams

922

Perform an LBT procedure on a wider beam including the plurality of beams

930

Transmit an APG as a waveform that indicates that the LBT procedure for one or more of the indicated plurality of beams was successful

932

Transmit the SRS via one or more transmission ports that are each associated with a different phase shift of the sequence and a successful LBT procedure

940

Receive a downlink transmission on the at least one beam during a COT

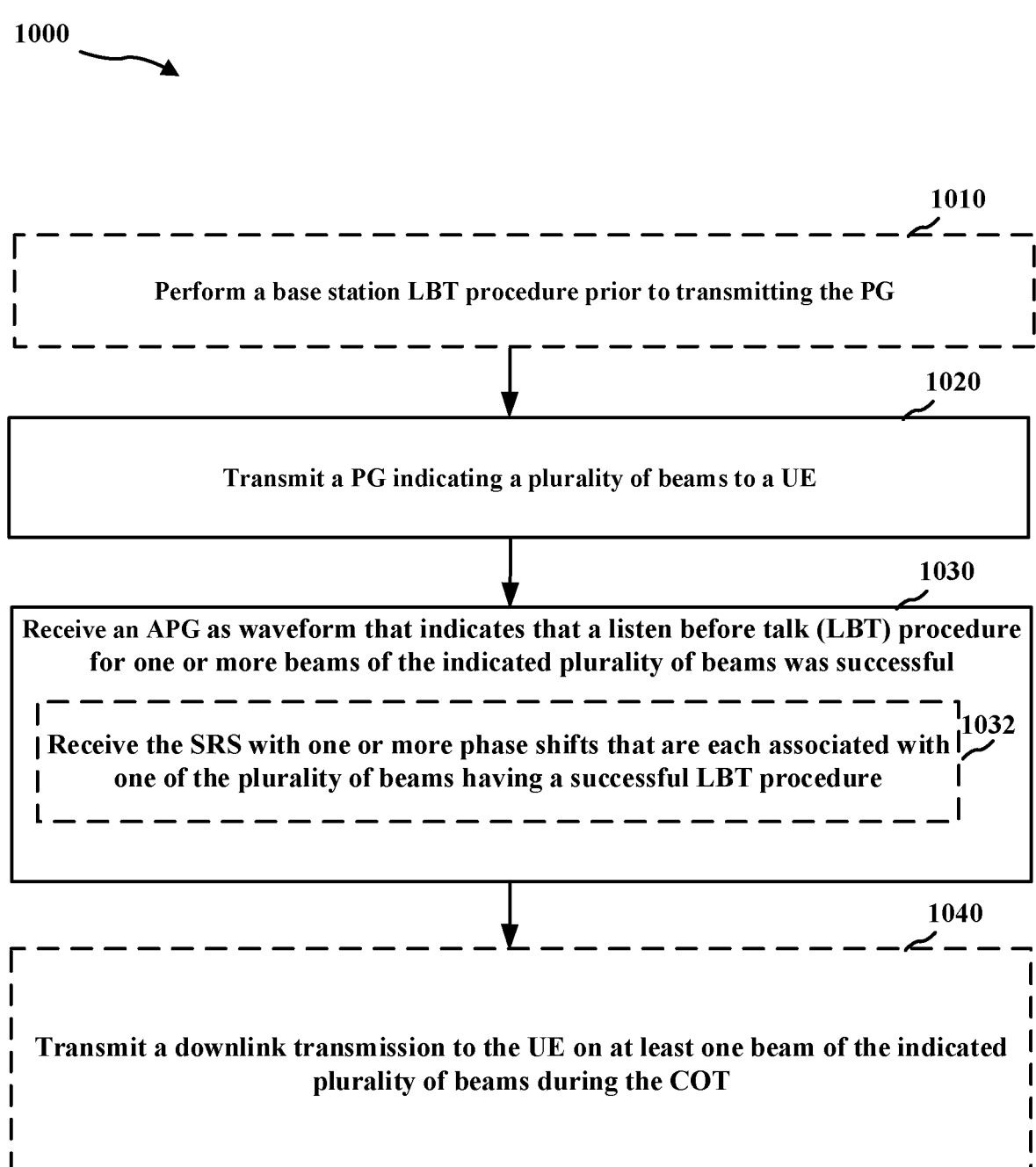

1010

Perform a base station LBT procedure prior to transmitting the PG

1020

Transmit a PG indicating a plurality of beams to a UE

1030

Receive an APG as waveform that indicates that a listen before talk (LBT) procedure for one or more beams of the indicated plurality of beams was successful

1032

Receive the SRS with one or more phase shifts that are each associated with one of the plurality of beams having a successful LBT procedure

1040

Transmit a downlink transmission to the UE on at least one beam of the indicated plurality of beams during the COT

FIG. 10

RECEIVE ASSISTED LISTEN BEFORE TALK WITH MULTIPLE CANDIDATE BEAMS AND WAVEFORM AS SINGLE ACKNOWLEDGMENT OF PRE-GRANT

CROSS-REFERENCE TO RELATED APPLICATIONS

This is a national stage application filed under 37 U.S.C. 371 of International Patent Application No. PCT/CN2021/086523, filed Apr. 12, 2021, titled "RECEIVE ASSISTED LISTEN BEFORE TALK WITH MULTIPLE CANDIDATE BEAMS AND WAVEFORM AS SINGLE ACKNOWLEDGMENT OF PRE-GRANT", the disclosure of which is incorporated herein by reference in its entirety.

TECHNICAL FIELD

The present disclosure relates to wireless communications using receive assisted listen before talk (LBT) with multiple candidate beams and a waveform as a single acknowledgment of a pre-grant (APG).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include receiving a pre-grant (PG) indicating a plurality of beams. The method may include performing a listen before talk (LBT) procedure on each beam of the indicated plurality of beams. The method may include transmitting an acknowledgment to the pre-grant (APG) as a waveform that indicates that the LBT procedure for one or more of the indicated plurality of beams was successful.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a base station (BS). The method may include transmitting a PG indicating a plurality of beams to a UE. The method may include receiving an APG as waveform that indicates that a LBT procedure for one or more beams of the indicated plurality of beams was successful.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 9 is a flowchart of an example method for a UE to perform multi-beam LBT to assist channel access.

FIG. 10 is a flowchart of an example method for a BS to access a channel with multi-beam LBT assistance from a UE.

Like reference numbers and designations in the various drawings indicate like elements.

DETAILED DESCRIPTION

Figure 1:
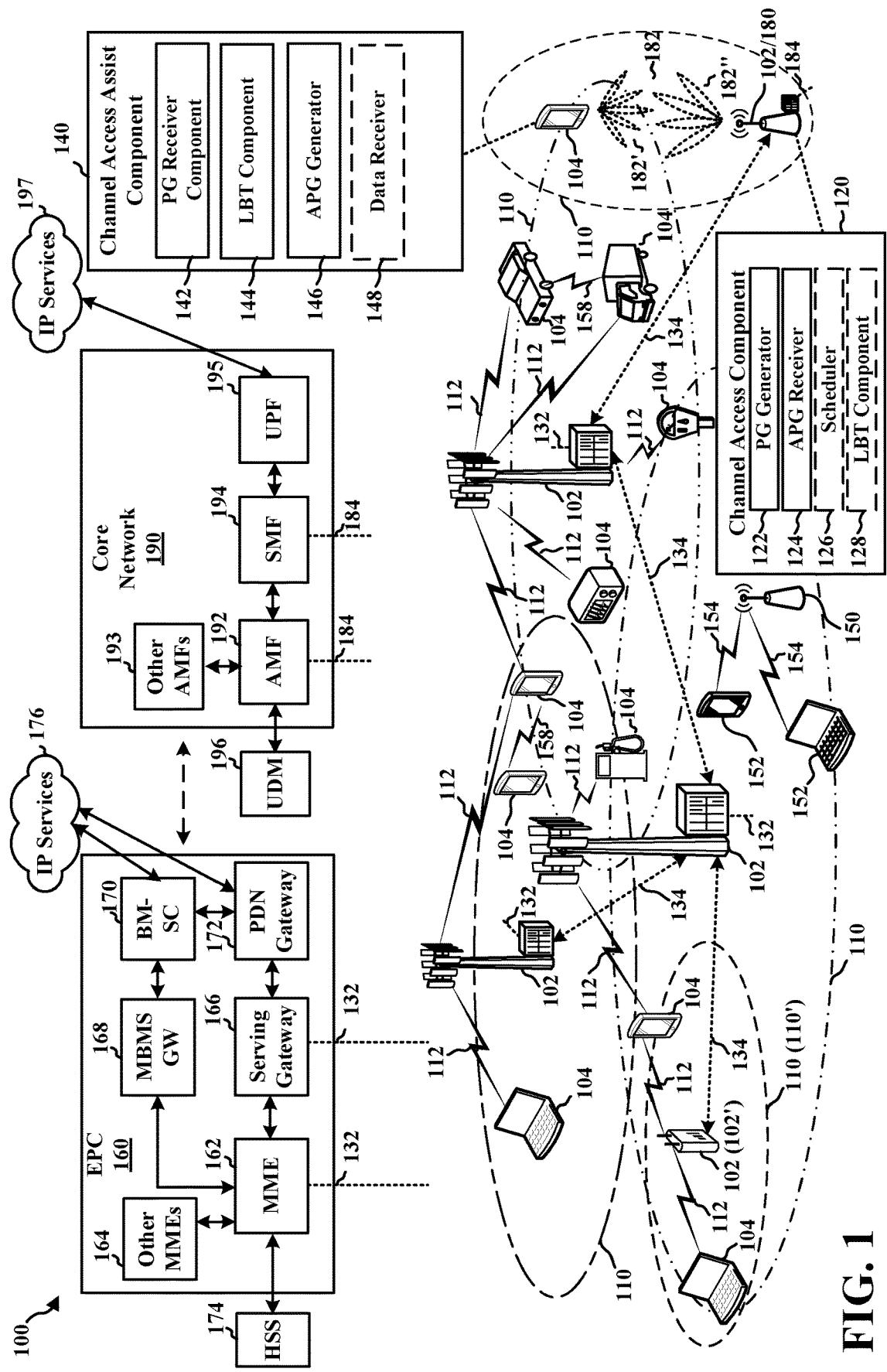
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TEIRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Access to a wireless communication channel in unlicensed spectrum may be conditioned on a listen before talk (LBT) procedure or a clear channel assessment (CCA) procedure. In higher frequency bands such as a 60 GHz unlicensed band (Fr2x), a narrow beamforming operation may be utilized to close a link between a transmitter and receiver. Conventionally, a LBT/CCA procedure is performed by a transmitting device. When narrow beamforming is used, however, the transmitter side channel sensing may not represent the interference level that the receiver will experience. One proposal to improve channel access is for the receiver to provide assistance information (signaling) to the transmitter only. That is, the receiver does not communicate with potential interfering devices.

For the Fr2x band, a channel access procedure may define a channel occupancy time (COT) for transmitting data that is subject to the LBT/CCA procedures and short control signalling that is exempt from contention. For example, the European Telecommunications Standards Institute (ETSI) has proposed the ETSI EN 302 567 standard for the 60 GHz band. In particular, to initiate a COT, the initiating device may perform a CCA check, which may be referred to as a long CCA, an extended CCA (eCCA), or a category 4 LBT procedure. As used herein, the terms long CCA, eCCA, and category 4 LBT refer to performing multiple checks on a transmission medium (e.g., a channel or a beam). For example, a long CCA may include generating a random counter within a range, determining whether the channel is idle for an observation window (e.g., 8 μs or 5 μs), and decrementing the counter if the channel is idle. The energy detection (ED) threshold for the CCA may be −80 dBm+ 10×log 10 (Operating Channel Bandwidth (in MHz))+10× log 10 (Pmax/Pout), where Pmax is the RF output power limit in Watts (W) for effective isotropic radiated power (EIRP) and Pout is the RF output power in W for EIRP. In contrast a short CCA or category 2 LBT procedure may refer to a single check of the transmission medium. A short CCA or category 2 LBT procedure may not result in a new COT. The initiating device may obtain the COT and access the channel when the counter reaches 0. After passing the CCA check, the initiating device can share the COT with responding devices. The responding device may not be required to do any CCA check to share the COT. There may not be a requirement on a length of a gap between the initiating device and responding device transmissions. For short control signalling, a device may transmit control messages as contention-free transmissions for a limited period (e.g., 10 ms) over a window (e.g., 100 ms).

Receiver side sensing may be used to check the interference condition at the receiver of the data traffic when LBT/CCA is required. For an UL traffic COT, the gNB acquires the COT with a Cat4 LBT (countdown based). This intrinsically includes Rx Assistance because the gNB is the receiver of the data. For DL traffic COT, there are two ways to obtain Rx Assistance. First, the gNB may be the initiator and obtain a COT with a Cat4 LBT, then send a pre-grant (PG) requesting an LBT (Cat2 or Cat4) from the UE for confirming the good channel conditions if DL data is sent. If the LBT passes, the UE may send a hard acknowledgment-to-pre-grant (APG). Detection of the hard APG at the gNB confirms to the gNB the possibility of sending data to the UE. Second, the gNB may send the PG under the short control signaling clause as a contention-exempt transmission (with optional Cat2 LBT). The gNB may request the UE to perform a Cat4 LBT to initiate a COT, which the UE will share by sending the APG back in case of success.

Previous proposals use different forms of DCIs with single resource indication as a pre-grant to trigger an LBT and, upon success, an APG on the single indicated resource. This means that if multiple beams are to be tried, multiple PG/APG handshakes are performed, with the consequent prolonging of the timeline before the DL data transmissions can start.

In an aspect, the present disclosure provides for a receiving device such as a user equipment (UE) to receive a single PG, perform an LBT procedure on multiple beams, and provide a single APG to the transmitting device (e.g., a base station or gNB) as a waveform such as a sounding reference signal (SRS). The PG may indicate the multiple beams for the APG. For example, the PG may be a downlink control information (DCI) with a field that maps to a set beams (e.g., a channel access table or channel state information (CSI) configuration). The APG may be a sounding reference signal (SRS) that indicates a successful LBT procedure for one or more of the beams. For example, detection of the SRS at a base station may indicate that the LBT procedure was successful. The transmitting device may be able to schedule the receiving device to receive a downlink transmission on any beam with a successful LBT procedure. Where the LBT procedure is a long CCA procedure, a COT for the downlink transmission may be defined based on the time of the APG and a maximum channel occupancy time (MCOT) value.

Particular implementations of the subject matter described in this disclosure can be implemented to realize one or more of the following potential advantages. The LBT procedure for multiple beams may allow greater flexibility in resource allocation and scheduling downlink transmissions. The use of a single PG and APG may provide the flexibility without increasing signaling overhead. Additionally, transmissions may be more reliable because conditions at the receiver are known and beam collisions can be managed. Accordingly, the disclosed subject matter provides efficient use of spectrum and/or enhanced throughput. The scheduled transmissions may comply with regulations that require LBT procedures.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

In some implementations, one or more of the UEs 104 may include a channel access assist component 140 that provides receiver side beam information. The channel access assist component 140 may include a PG receiver component 142 configured to receive a PG indicating a plurality of beams. The channel access assist component 140 may include a LBT component 144 configured to perform a LBT procedure on each beam of the indicated plurality of beams. The channel access assist component 140 may include an APG generator 146 configured to transmit an APG as a waveform that indicates that the LBT procedure for one or more of the indicated plurality of beams was successful. In some implementations, the channel access assist component 140 may optionally include a data receiver 148 configured to receive a downlink transmission on at least one beam during a COT.

In some implementations, one or more of the base stations 102 may include a channel access component 120 configured to access a channel based on LBT assistance from a receiving device. The channel access component 120 may include a PG generator 122 configured to transmit a PG indicating a plurality of beams to a UE. The channel access component 120 may include an APG receiver 124 configured to receive an APG as waveform that indicates that a listen before talk (LBT) procedure for one or more beams of the indicated plurality of beams was successful. In some implementations, the channel access component 120 may optionally include a scheduler 126 configured to transmit a downlink transmission on the at least one beam during a COT. In some implementations, the channel access component 120 may optionally include an LBT component 128 configured to perform an LBT procedure prior to the PG.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
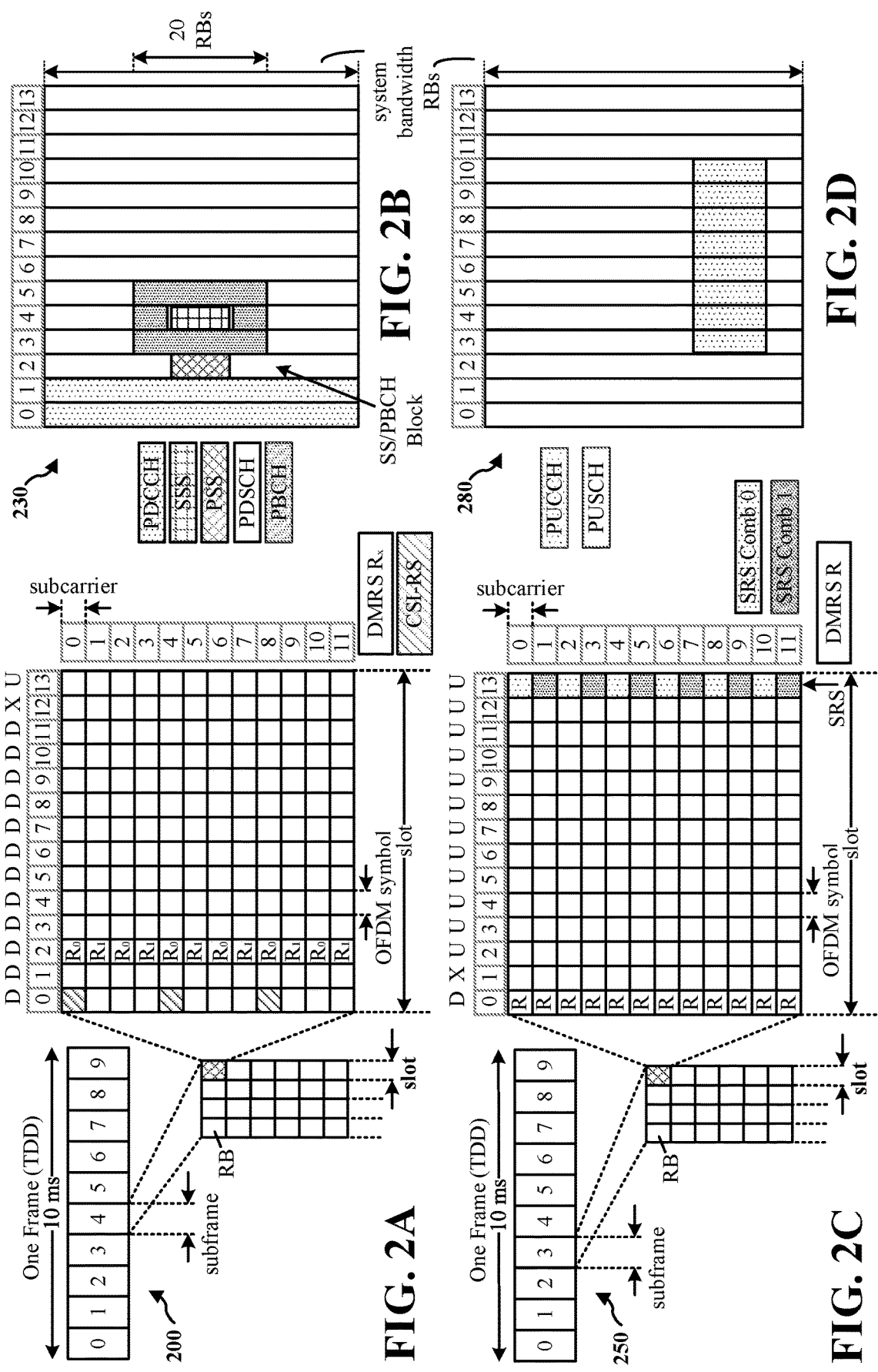
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 microseconds (p).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
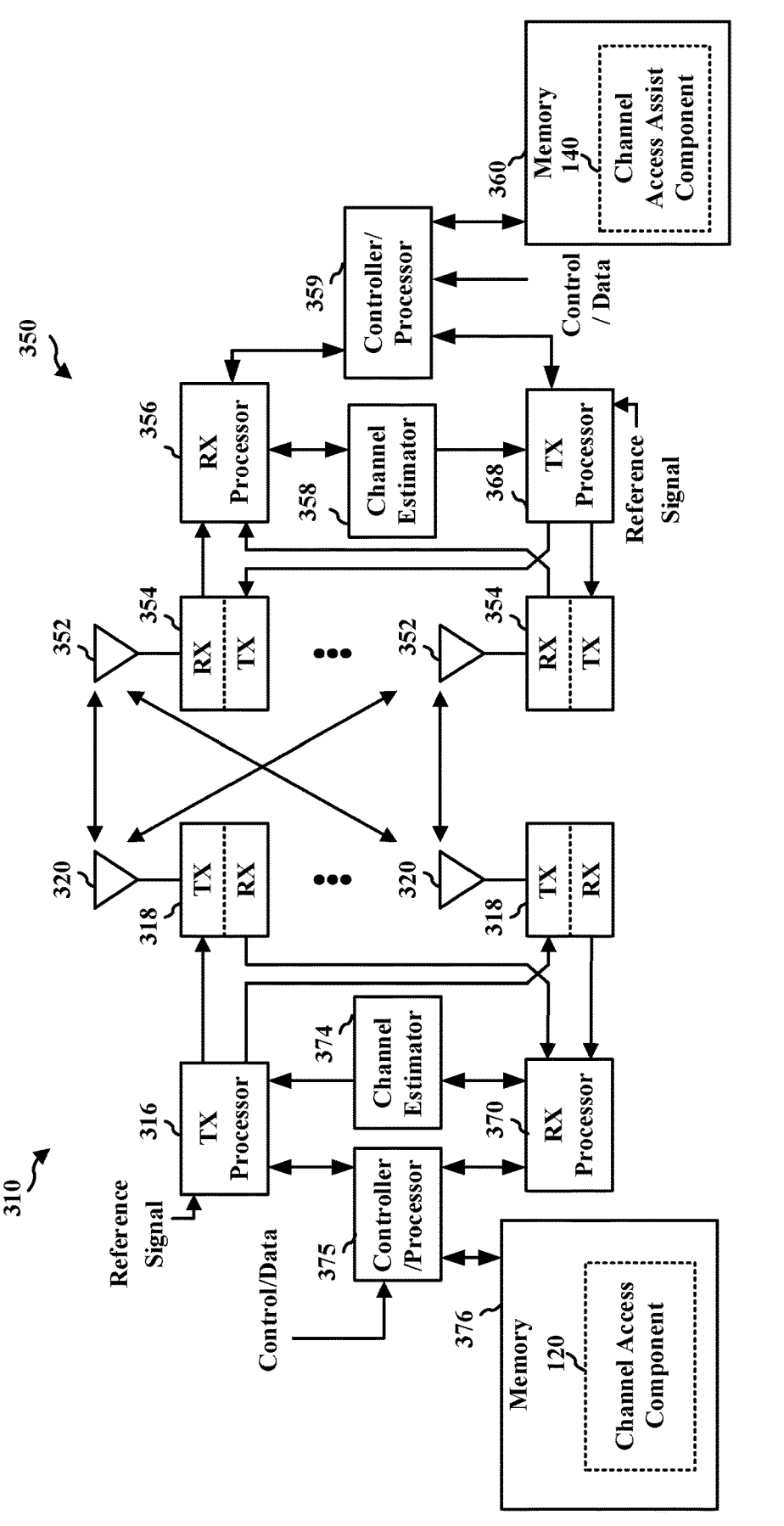
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with channel access assist component 140 of FIG. 1.

At least one of the TX processor 316, the RX processor 370, and the controller/processor 375 may be configured to perform aspects in connection with the channel access component 120 of FIG. 1.

Figures 4A, 4B:
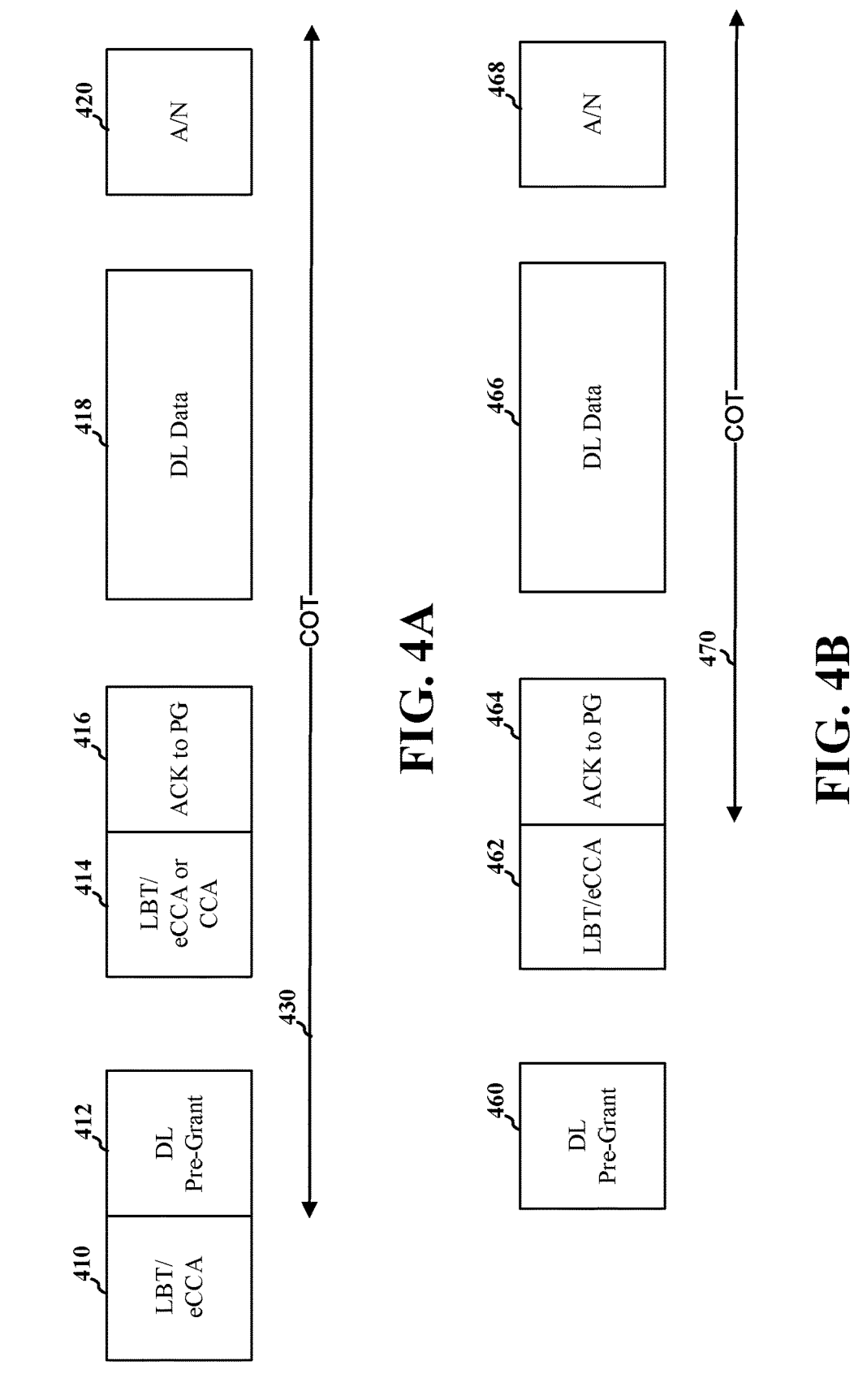
FIG. 4A is a diagram illustrating example messages for a channel access procedure with LBT receiver assistance for a transmitter channel occupancy time.
FIG. 4B is a diagram illustrating example messages for a channel access procedure with LBT receiver assistance for a receiver channel occupancy time.

FIG. 4A is a diagram 400 illustrating example messages for a channel access procedure with LBT receiver assistance for a transmitter COT. The transmitter (e.g., a base station or gNB) may be the initiator and obtain a COT 430 with a category 4 LBT or eCCA procedure 410. The transmitter may then send a PG 412 requesting an LBT procedure 414 (e.g., Cat2 or Cat4) from the UE to confirm the good channel conditions if DL data is to be sent. If the channel passes the LBT at the UE, the UE may send a hard APG 416. The detection of the hard APG 416 at the transmitter confirms to the transmitter the possibility of sending downlink data 418 to the UE during the COT 430. The UE may transmit an ACK/NACK 420 based on the DL data 418.

FIG. 4B is a diagram illustrating example messages for a channel access procedure with LBT receiver assistance for a receiver COT. The transmitter may send the PG 460 under the short control signaling clause. The PG 460 may be a contention-exempt transmission or may be based on an optional Cat2 LBT. The PG 460 may request the UE to perform a Cat4 LBT 462 (e.g., an eCCA) to initiate a COT 470. The UE may share the COT 470 by sending a hard APG

464 back to the transmitter in case of success. The detection of the hard APG 464 at the transmitter confirms to the transmitter the possibility of sending downlink data 466 to the UE during the COT 470. The UE may transmit an ACK/NACK 468 based on the DL data 466.

Figure 5:
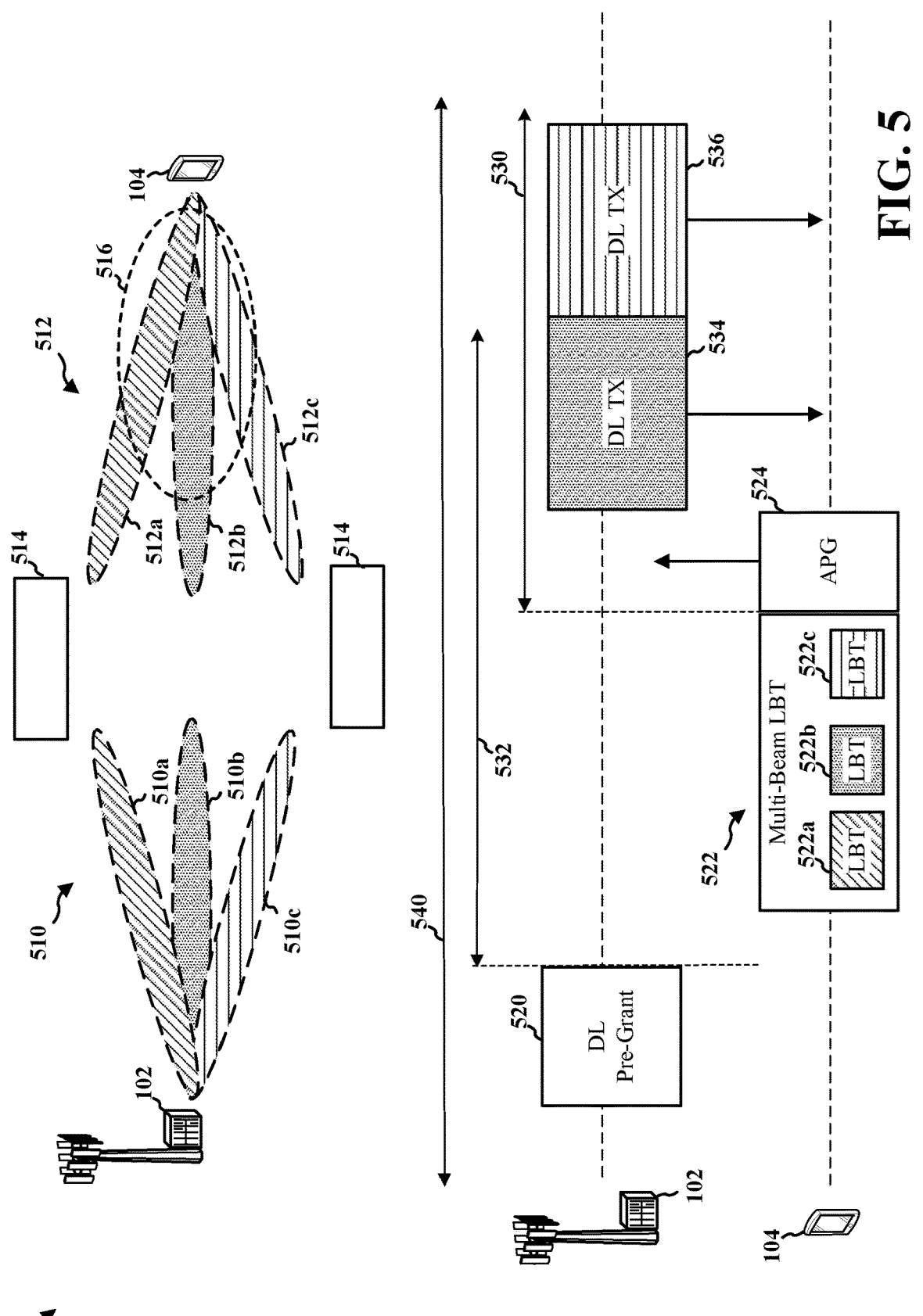
FIG. 5 is a diagram illustrating example messages for a channel access procedure with LBT receiver assistance for multiple beams.

FIG. 5 is a diagram 500 illustrating example messages for a channel access procedure with LBT receiver assistance for multiple beams. The base station 102 and the UE 104 may communicate over different beams. For example, the base station may transmit using a transmit beam 510 and the UE 104 may receive via one or more of a plurality of receive beams 512. A receive beam 512 may correspond to a transmit beam 510. For example, the receive beam 512a may be the best receive beam 512 for receiving the transmit beam 510. For instance, the receive beam 512a may be directed toward an object 514 that reflects the transmit beam 510a. Similarly, the receive beam 512b may correspond to the transmit beam 510b and the receive beam 512c may correspond to the transmit beam 510c. As discussed above, when the base station 102 performs a LBT procedure in a frequency band where narrow beamforming is used, the channel sensing at the base station 102 may not detect interference that would be experienced by the UE 104. The interference may also vary significantly based on the receive beam of the UE 104.

In an implementation, the base station 102 may transmit a downlink PG 520. The PG 520 may indicate a plurality of beams 512 and a transmission resource. In an aspect, the PG 520 may be considered short control signaling and may be a contention-free transmission. In some implementations, there may be an existing COT (e.g., based on an LBT procedure performed by the base station 102).

The UE 104 may perform a multi-beam LBT procedure 522. In an implementation, the multi-beam LBT procedure 522 may include an LBT procedure on each of the plurality of beams. For instance, the UE 104 may perform an LBT procedure 522a on the receive beam 512a, an LBT procedure 522b on the receive beam 512b, and an LBT procedure 522c on the receive beam 512c. In an aspect, a channel access procedure with LBT receiver assistance for multiple beams may be based on either a transmitter COT or a receiver COT as discussed above with respect to FIGS. 4A and 4B. The LBT procedure 522 for each beam may be either long (e.g., category 4 LBT or eCCA) or short (e.g., category 2 LBT or CCA) depending on whether the UE 104 is to acquire a new receiver COT or an existing COT is to be used.

In some implementations, the multi-beam LBT procedure 522 may utilize time division multiplexing to perform the individual LBT procedures in sequence. In another implementation, the multi-beam LBT procedure may utilize space division multiplexing in which the individual LBT procedures are performed concurrently. In some implementations, the UE 104 may partition the plurality of beams 512 into one or more groups. For example, the UE 104 may group the beams 512a, 512b, and 512c and perform an LBT procedure on a wider beam 516 that includes the beams 512a, 512b, and 512c within an aperture of the wider beam 516. Where the channel access procedure uses a receiver COT, a successful LBT procedure may start the receiver COT. For instance, the COT 530 may start at the end of the multi-beam LBT procedure 522 or start of the APG 524

The UE 104 may transmit the APG 524 as a waveform indicating success of the multi-beam LBT procedure 522 for at least one of the beams 512. In some implementations, the APG 524 may be a SRS. The UE 104 may be configured with resources for transmitting SRS. The SRS may indicate the success of the multi-beam LBT procedure 522 based on a sequence selected for the SRS. For example, one SRS sequence may be configured to indicate a successful LBT procedure 522. Accordingly, presence of the SRS with the configured sequence may indicate to the base station 102 that the LBT procedure 522 was successful. In some implementations, the presence of the SRS may indicate that the LBT procedure 522 was successful for all of the indicated beams 512. In some implementations, the SRS may be transmitted via different antenna ports with different phase shifts. The different phase shifts may indicate whether a subset of the individual LBT procedures 522 was successful. For example, each phase shift may correspond to one of LBT procedure 522a, 522b, or 522c.

A receiver COT 530 may be defined by the end of the respective LBT procedure 522 and a maximum channel occupancy time (MCOT) value (e.g., 5 ms). Accordingly, by transmitting the APG 524, the UE 104 may share the new receiver COT 530 with the base station 102. In some implementations, (e.g., where the multi-beam LBT procedure 522 uses a TDM mode), the individual LBT procedures 522a, 522b, 522c may complete at different times and a COT may be acquired by the UE 104 at the end of each individual LBT procedure. In an aspect, however, the waveform of the APG 524 may not be able to indicate start times of the different COTs. In order to avoid transmitting outside of the COT, the base station 102 may assume that a COT 532 starts at an agreed time between an end of the PG 520 and an end of the first individual LBT procedure 522a. For instance, the agreed time may be the end of the PG 520 plus a configured offset that is less than a minimum duration of the LBT procedure 522a. The COT 532 may be defined by the agreed time and the MCOT value.

The COTs 530, 532 may allow the base station 102 to schedule a downlink transmission 534 or 536 during the COTs 530, 532. For example, the base station may transmit the downlink transmission 534 on the transmit beam 510b during the COT 530 and/or the base station 102 may transmit the downlink transmission 536 on the transmit beam 510c during the COT 532. In some implementations, the base station 102 may schedule a downlink transmission on fewer than the available COTs, or may schedule no downlink transmission on the available COTs.

Figure 6:
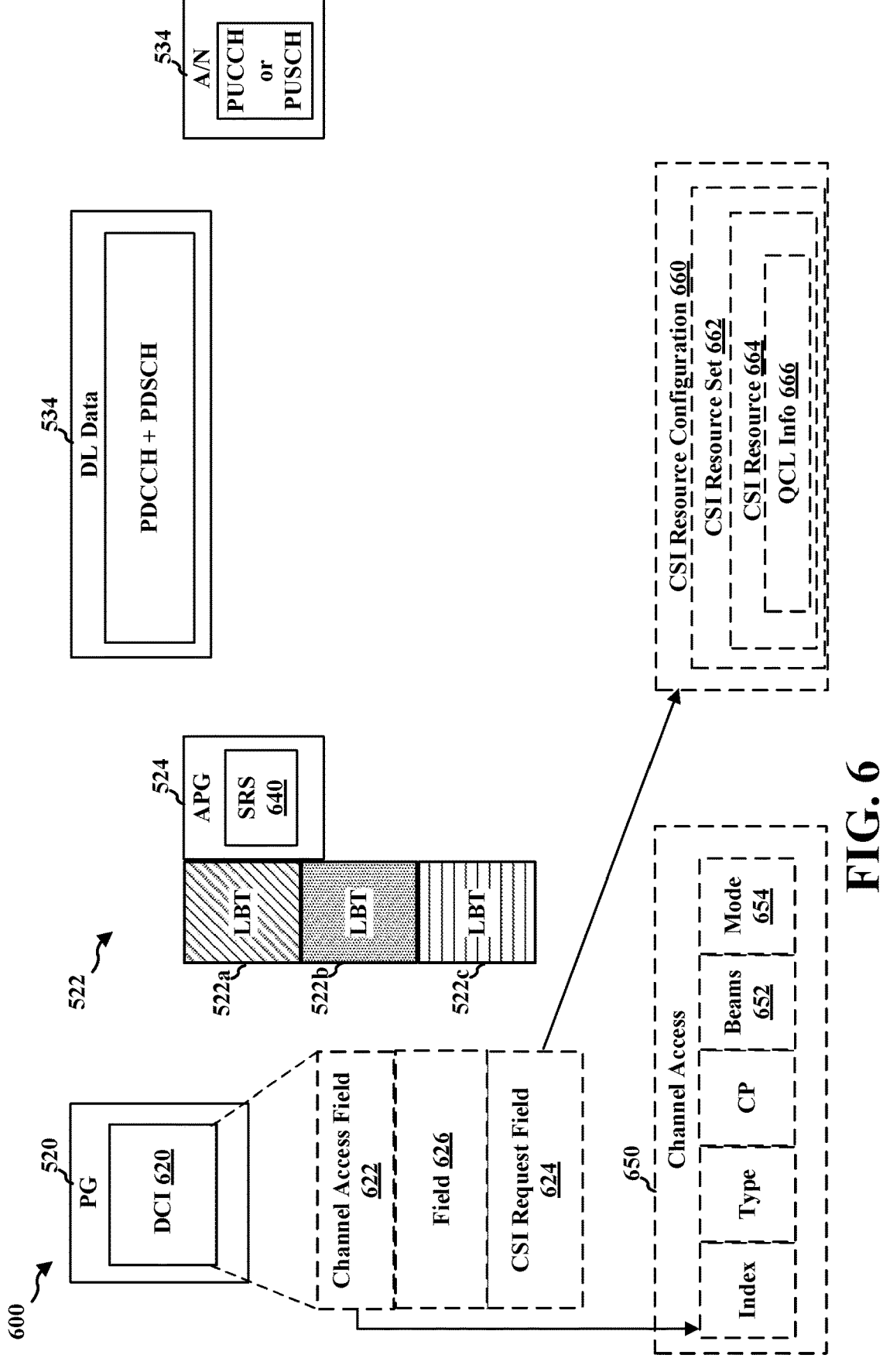
FIG. 6 is a diagram illustrating example signaling of multiple beams for a channel access procedure with LBT receiver assistance.

FIG. 6 is a diagram 600 illustrating example signaling of multiple beams for a channel access procedure with LBT receiver assistance. The channel access procedure may utilize 5G NR channels and messages for performing the channel access procedure.

The PG 520 may transmitted as a DCI 620. For example the DCI 620 may be either an uplink scheduling DCI or a downlink scheduling DCI. For instance, the DCI 620 may follow DCI format 0_0 or 1_0. In some implementations, the DCI 620 may be an empty grant. For instance, the DCI 620 may indicate an invalid resource assignment or a reserved MCS to indicate that no shared channel transmission is scheduled by the DCI 620. Instead, the empty grant may be interpreted as the PG 520 that triggers the multi-beam LBT procedure 522.

The DCI 620 may include a field that indicates the plurality of beams 512 for the multi-beam LBT procedure. For example, the DCI 620 may include a channel access field 622 that identifies an entry or index in a configured channel access table 650. For instance, the channel access table 650 may be defined in a standards document or regulation. The channel access table 650 may be further configured via RRC signaling to include a set of beams 652 (e.g., a set of TCI state indices) identifying the plurality of beams. In some implementations, the channel access table 650 may be configured to include a mode 654 that identifies a multi-beam LBT procedure mode such TDM, SDM, or wide-beam. The channel access field 622 may identify an entry in the channel access table 650. Alternatively, a separate table that includes the beams 652 and/or the mode 654 may be defined in a standard or regulation or signaled via RRC. Reserved bits of the DCI 620 may define a new field 626 that identifies an entry in the separate table or identifies the mode 654 directly. In another aspect, the DCI 620 may include a CSI request field 624 that indicates a CSI report configuration 660. The CSI report configuration 660 may be configured (e.g., by RRC and/or MAC signaling) with a plurality of beams. For example, the CSI resource configuration may include one or more CSI resource sets 662, which include one or more CSI resources 664, which include one or more quasi-co-location (QCL) information 666 that identify a beam as a transmission configuration indicator (TCI) state. Accordingly, the uplink scheduling DCI 620 may dynamically indicate the plurality of beams on which the UE 104 is to perform the multi-beam LBT procedure 522.

The APG 524 may be transmitted as a SRS 640. The SRS 640 may be transmitted based on an SRS configuration that reserves resources for SRS transmission. The SRS configuration may define an SRS sequence that indicates that the LBT procedure was successful. The UE 104 may transmit the SRS 640 with the defined sequence on a first SRS resource after the successful LBT procedure. The UE 104 may transmit an SRS with a different sequence on other SRS resources. In an aspect, the SRS 640 may be considered a short control signal that may be transmitted as a contention-free transmission. In another aspect, the SRS 640 may be transmitted during the COT 530 obtained via the multi-beam LBT procedure 522. In an aspect, the SRS 640 may be transmitted via one or more transmission ports that are each associated with a different phase shift of the sequence and a successful LBT procedure. Accordingly, the SRS 640 may indicate a subset of the plurality of beams 512 having a successful LBT procedure.

Figure 7:
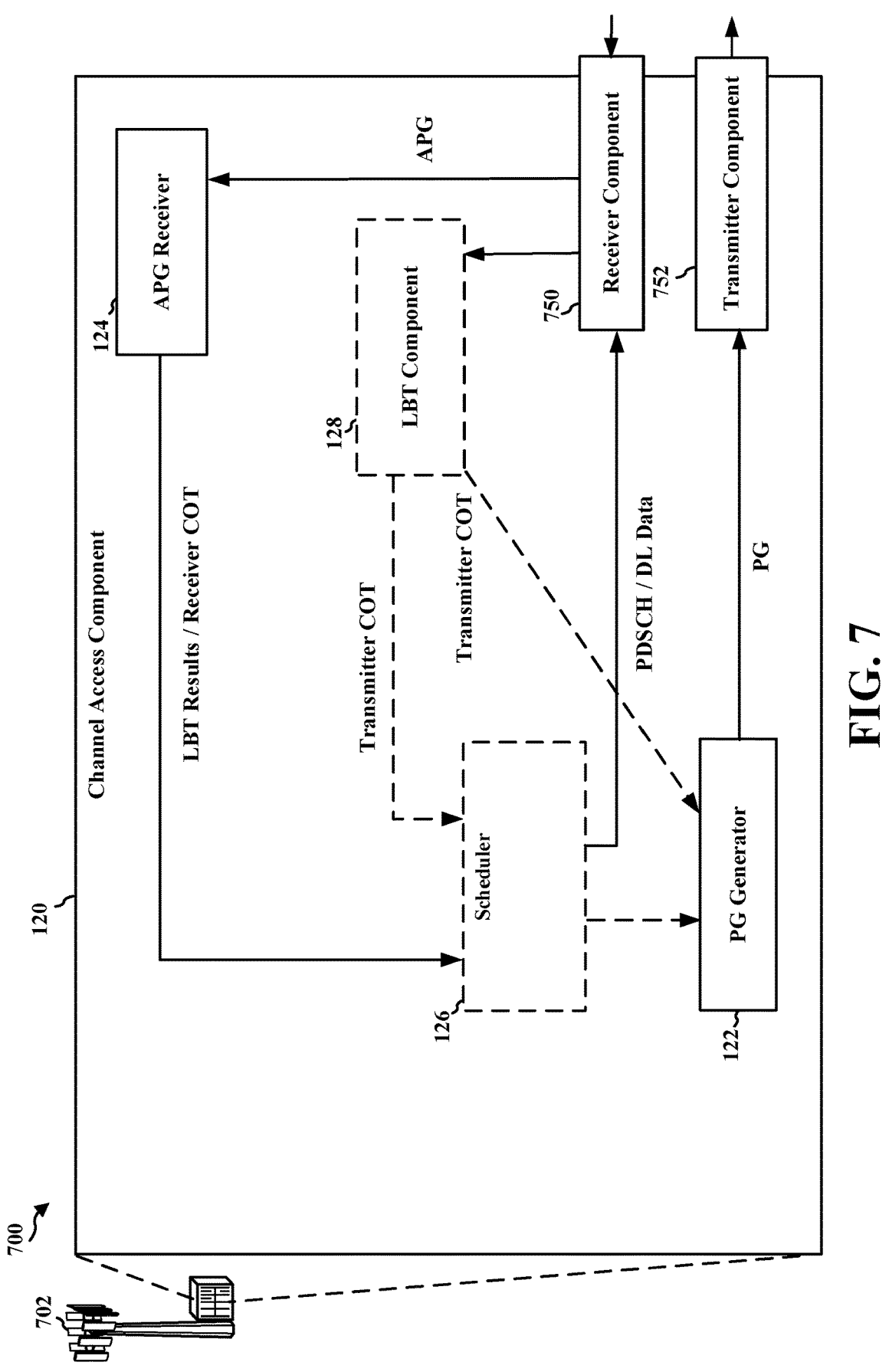
FIG. 7 is a conceptual data flow diagram illustrating the data flow between different means/components in an example BS.

FIG. 7 is a conceptual data flow diagram 700 illustrating the data flow between different means/components in an example base station 702, which may be an example of the base station 102 including the channel access component 120. The channel access component 120 may be implemented by the memory 376 and the TX processor 316, the RX processor 370, and/or the controller/processor 375 of FIG. 3. For example, the memory 376 may store executable instructions defining the channel access component 120 and the TX processor 316, the RX processor 370, and/or the controller/processor 375 may execute the instructions.

The base station 102 may include a receiver component 750, which may include, for example, a radio frequency (RF) receiver for receiving the signals described herein. The base station 102 may include a transmitter component 752, which may include, for example, an RF transmitter for transmitting the signals described herein. In an aspect, the receiver component 750 and the transmitter component 752 may co-located in a transceiver such as illustrated by the TX/RX 318 in FIG. 3.

As discussed with respect to FIG. 1, the channel access component 120 may include the PG generator 122 and the APG receiver 124. The channel access component 120 may optionally include the scheduler 126 and/or the LBT component 128.

The PG generator 122 may be configured to transmit a PG 520 indicating a plurality of beams to a UE 104 via the transmitter component 752. In some implementations, the PG generator 122 may receive an indication from the scheduler 126 that the base station 102 has downlink data to transmit to the UE 104. In some implementations, the PG generator 122 may receive an indication from the LBT component 128 indicating that the base station 102 has acquired a transmitter COT. In other implementations, the PG generator 122 may autonomously determine to transmit the PG 520. For example, the PG generator 122 may periodically transmit the PG 520 to have the UE 104 measure channel conditions. The PG generator 122 may determine the plurality of beams based on, for example, available beams indicated by the scheduler 126 and/or beams that have passed the transmitter LBT procedure and have a transmitter COT. In some implementations, the PG generator 122 may format the PG based on a DCI format (e.g., DCI format 0_0 or 1_0). In an aspect, the PG generator 122 may generate the DCI as an empty grant for either UL or DL. For instance, the DCI may include an invalid resource assignment or a reserved MCS to indicate that no transmission is actually scheduled by the DCI. Instead, the DCI may be used to carry information for the LBT procedure. For example, the PG generator 122 may set a field such as the channel access field 622 based on the determined plurality of beams and the configured channel access table 650 for the UE 104. For instance, the PG generator 122 may select a value of the channel access field 622 that indicates beams that match the determined beams. Alternatively, the PG generator 122 may include the CSI request field 624 in the DCI 620 to identify a CSU resource set 662 that includes the determined beams. The PG generator 122 may transmit the PG 520 via the transmitter component 752. For example, the PG generator 122 may transmit the PG 520 on a PDCCH that the UE 104 is configured to monitor.

The receiver component 750 may receive UL signals from the UE 104 including the APG 524. The receiver component 750 may provide the APG 524 to the APG receiver 124. In some implementations, the receiver component 750 may sense a channel during an LBT procedure. The receiver component 750 may provide energy detected during the LBT procedure or a measurement thereof to the LBT component 128.

The APG receiver 124 may be configured to receive the APG 524 on the transmission resource. The APG 524 may be a SRS 640. Accordingly, the APG receiver 124 may correlate a received signal with a configured SRS sequence for LBT success to determine whether the APG 524 is detected. Presence of the SRS 640 may indicate that the multi-beam LBT procedure 522 was successful. In an aspect, the APG receiver 124 may determine one or more phase shifts of the SRS 640. If one or more phase shifts are detected, the APG receiver may determine subset of the plurality of beams that are associated with the phase shift. Accordingly, the APG receiver 124 may determine whether all of the beams or a subset thereof are associated with a successful LBT procedure. In an aspect, the APG receiver 124 may determine a receiver COT based on the APG 524. In some implementations, the start of the COT 530 may be the start of the APG 524 and the duration of the COT 530 may be based on the MCOT value. In some implementations, where a TDM mode is used for the LBT procedure, the end of the LBT procedure may vary between beams, but the APG 524 may not be able to indicate the end of the individual LBT procedures 522a, 522b, 522c. In such implementations, the APG receiver 124 may conservatively determine that the receiver COT 532 starts at an agreed time between the PG 520 and an end of the first LBT procedure

522a. The duration of the receiver COT 532 may be the MCOT such that the end of the receiver COT 532 as determined by the APG receiver 124 does not extend past a COT determined based on the end of the individual LBT procedure for any beam. The APG receiver 124 may provide the beam information and the receiver COT to the scheduler 126.

The LBT component 128 may be configured to perform a base station LBT procedure. In some implementations, the LBT component 128 may perform the base station LBT procedure prior to the PG generator 122 transmitting the PG 520. The base station LBT procedure may be either a category 4 LBT procedure such as eCCA or a category 2 LBT procedure such as CCA. The LBT component 128 may control the receiver component 750 to sense one or more beams. The LBT component 128 may determine the energy detected on each beam and compare the energy detected to an energy detection threshold. If the LBT procedure is successful, the LBT component 128 may obtain a transmitter COT 540. The LBT component 128 may indicate the transmitter COT to the PG generator 122 and/or the scheduler 126.

The scheduler 126 may be configured to transmit a downlink transmission (e.g., DL Tx 534, 536) on the one or more beams during a COT. The scheduler 126 may schedule the downlink transmission in response to the APG 524. For example, the scheduler 126 may select resources for the downlink transmission based on the time of the APG 524. In some implementations, the scheduler 126 may schedule a downlink transmission on each of the indicated plurality of beams with a successful LBT procedure.

Figure 8:
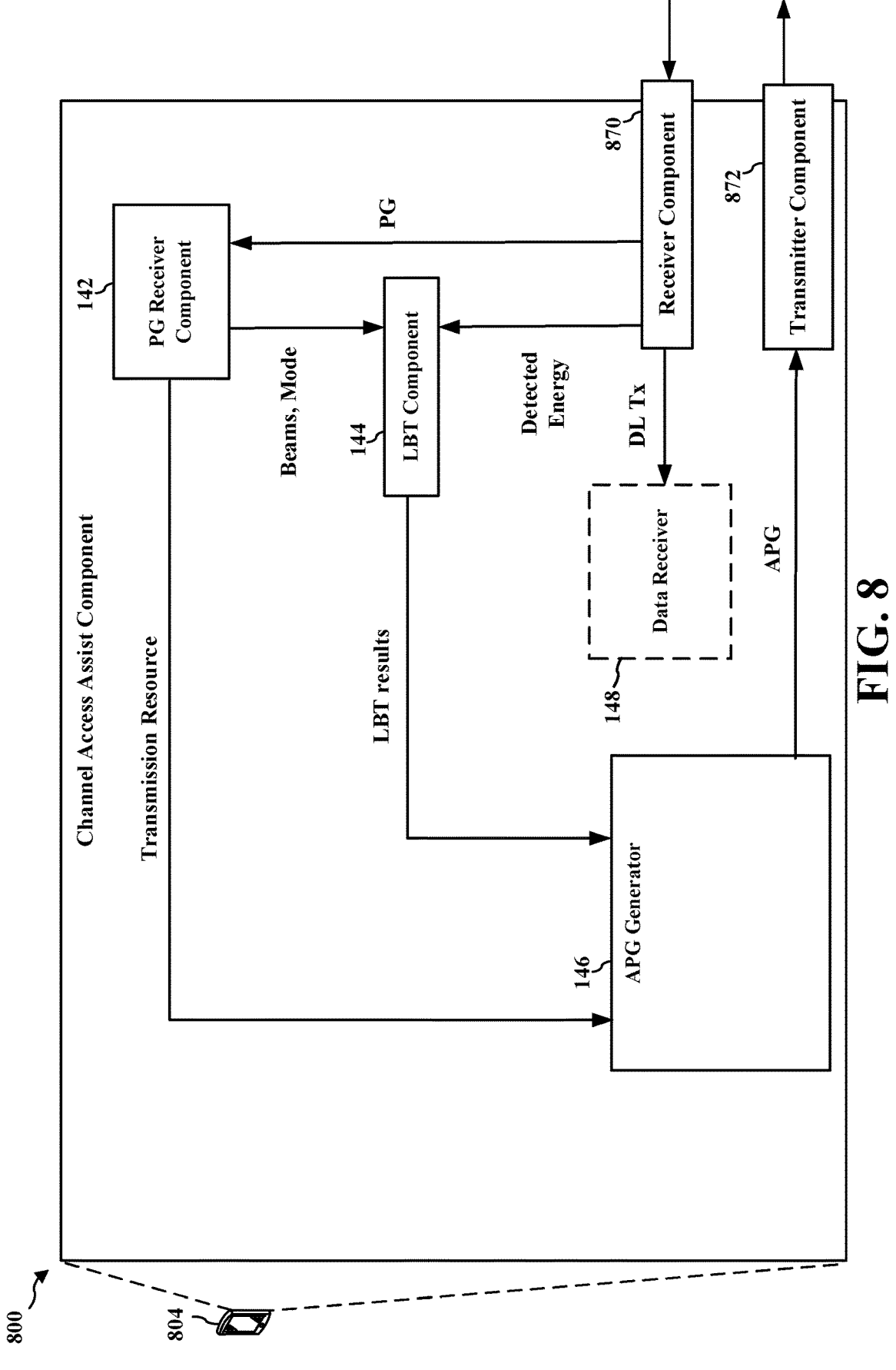
FIG. 8 is a conceptual data flow diagram illustrating the data flow between different means/components in an example UE.

FIG. 8 is a conceptual data flow diagram 800 illustrating the data flow between different means/components in an example UE 804, which may be an example of the UE 104 and include the channel access assist component 140. The channel access assist component 140 may be implemented by the memory 360 and the TX processor 368, the RX processor 356, and/or the controller/processor 359. For example, the memory 360 may store executable instructions defining the channel access assist component 140 and the TX processor 368, the RX processor 356, and/or the controller/processor 359 may execute the instructions.

The UE 104 may include a receiver component 870, which may include, for example, a RF receiver for receiving the signals described herein. The UE 104 may include a transmitter component 872, which may include, for example, an RF transmitter for transmitting the signals described herein. In an aspect, the receiver component 870 and the transmitter component 872 may co-located in a transceiver such as the TX/RX 352 in FIG. 3.

As discussed with respect to FIG. 1, the channel access assist component 140 may include the PG receiver component 142, the LBT component 144, and the APG generator 146. The channel access assist component 140 may optionally include a data receiver 148.

The receiver component 870 may receive DL signals such as the PG 520 and the DL Tx 534 or 536. The receiver component 870 may provide the PG 520 to the PG receiver component 142. The receiver component 870 may provide the DL Tx 534 or 536 to the data receiver 148. The receiver component 870 may sense a channel during an LBT procedure 522. The receiver component 870 may provide energy detected during the LBT procedure or a measurement thereof to the LBT component 144.

The PG receiver component 142 may be configured to receive a PG 520 indicating a plurality of beams. For example, the PG receiver component 142 may receive the PG 520 via the receiver component 870. In some implementations, the PG 520 may be a DCI 620 that is received on a PDCCH. The PG receiver component 142 may perform blind decoding on PDCCH candidates in a configured CORESET to detect the PG 520. The PG receiver component 142 may decode the uplink scheduling DCI 620 based on a DCI format (e.g., DCI format 0_0 or 1_0) to determine the values of one or more fields. For example, the PG receiver component 142 may determine a value of a channel access field 622. The PG receiver component 142 may determine an entry in the channel access table 650 based on the value of the channel access field 622. The PG receiver component 142 may determine the beams 652 and/or mode 654 for the entry. In another implementation, the PG receiver component 142 may determine a CSI resource set 662 indicated by a CSI request field 624. The PG receiver component 142 may determine the plurality of beams that are configured for the CSI resource set 662. In some implementations, the PG receiver component 142 may determine a multiplexing mode for the multi-beam LBT procedure 522 based on a field 626, which may be 2 bits, for example. The PG receiver component 142 may provide the beams and the mode to the LBT component 144.

The LBT component 144 may be configured to perform a LBT procedure on each beam of the indicated plurality of beams. The LBT component 144 may receive an indication of the plurality of beams from the PG receiver component 142. The LBT component 144 may perform either a long LBT procedure or a short LBT procedure on each of the indicated plurality of beams. For example, the PG 520 may indicate which LBT procedure to select. The LBT component 144 may determine a counter based on the selected LBT procedure. In some implementations, the LBT component 144 may receive an indication of a multiplexing mode from the PG receiver component 142. The LBT component 144 may perform the LBT procedure 522 by controlling the receiver component 870 to measure detected energy on each of the plurality of beams (e.g., receive beams 512a, 512b, and 512c). For example, the LBT component 144 may measure the receive beams 512 sequentially in the TDM mode, concurrently in the SDM mode, or with a wider beam 516 in the wide-beam mode. The LBT component 144 may compare the detected energy to a detected energy threshold to determine whether to decrement the counter. The LBT component 144 may determine that the LBT procedure is successful when the counter reaches 0. The LBT component 144 may determine that the LBT procedure has failed when a time limit for the LBT procedure has been reached. The LBT component 144 may provide the LBT results for each beam to the APG generator 146. In cases where the LBT procedure results in a new receiver COT, the LBT component 144 may provide a timestamp of the end of the LBT procedure and start of the new receiver COT to the APG generator 146.

The APG generator 146 may be configured to transmit an APG 524 when the LBT procedure 522 is successful. If the LBT procedure 522 fails, the APG generator 146 may not transmit any signal. The APG generator 146 may receive the result of the LBT procedure from the LBT component 144. In some implementations, the APG generator 146 may generate the APG 524 as the SRS 640. For instance, the SRS configuration for the UE 804 may specify an SRS sequence for indicating a successful LBT procedure. In some cases, the APG generator 146 may transmit the SRS sequence via one or more antenna ports with different phase shifts. Each phase shift may correspond to a subset of the beams 512. The APG generator 146 may select the antenna ports with a phase shift corresponding to the successful individual LBT procedures. The APG generator 146 may transmit the APG 524 via the transmitter component 872.

The data receiver 148 may be configured to receive a downlink transmission on at least one beam with a successful LBT procedure. For example, the data receiver 148 may control the receiver component 870 to monitor a CORESET for a DCI that schedules the downlink transmission during a COT for the at least one beam. The data receiver 148 may receive the downlink transmission during the COT based on the DCI. The data receiver 148 may provide the received data to higher layers. In some implementations, the data receiver 148 may provide an acknowledgment or negative acknowledgment of the downlink transmission to the transmitter component 872.

FIG. 9 is a flowchart of an example method 900 for a UE to perform multi-beam LBT to assist channel access. The method 900 may be performed by a UE (such as the UE 104, which may include the memory 360 and which may be the entire UE 104 or a component of the UE 104 such as the channel access assist component 140, TX processor 368, the RX processor 356, or the controller/processor 359). The method 900 may be performed by the channel access assist component 140 in communication with the channel access component 120 of the base station 102. Optional blocks are shown with dashed lines.

At block 910, the method 900 may include receiving a PG indicating a plurality of beams. In some implementations, for example, the UE 104, the RX processor 356 or the controller/processor 359 may execute the channel access assist component 140 or the PG receiver component 142 to receive the PG 520 indicating a plurality of beams 512. In some implementations, the PG 520 is a DCI such as the DCI 620. In some implementations, the DCI 620 is an empty grant with an invalid resource assignment or reserved MCS. In some implementations, the DCI 620 includes a field (e.g., channel access field 622) that indicates the plurality of beams based on a configured mapping of field values to sets of beams (e.g., channel access table 650). In some implementations, the configured mapping indicates a multi-beam LBT mode. In some implementations, the DCI 620 includes a channel state information (CSI) request field 624 that indicates a CSI resource e.g., CSI resource 664 associated with the indicated plurality of beams. In some implementations, the DCI 620 includes one or more bits (e.g., field 626) that indicate a multi-beam LBT mode. Accordingly, the UE 104, the RX processor 356, or the controller/processor 359 executing the channel access assist component 140 or the PG receiver component 142 may provide means for receiving a PG indicating a plurality of beams.

At block 920, the method 900 may include performing a LBT procedure on each beam of the indicated plurality of beams. In some implementations, for example, the UE 104, the RX processor 356 or the controller/processor 359 may execute the channel access assist component 140 or the LBT component 144 to perform the LBT procedure 522 on each beam of the indicated plurality of beams 512. In some implementations, the LBT procedure is an eCCA procedure. In some implementations, the LBT procedure is a CCA procedure. In some implementations, the LBT procedure for each beam of the indicated plurality of beams is TDM as illustrated in FIG. 5. In some implementations, the LBT procedure for each beam of the indicated plurality of beams is SDM as illustrated in FIG. 6. In some implementations, at sub-block 922, the block 920 may include performing an LBT procedure on a wider beam (e.g., beam 516) including the plurality of beams 512. Accordingly, the UE 104, the RX processor 356, or the controller/processor 359 executing the channel access assist component 140 or the LBT component 144 may provide means for performing a LBT procedure on each beam of the indicated plurality of beams.

At block 930, the method 900 may include transmitting an APG as a waveform that indicates that the LBT procedure for one or more of the indicated plurality of beams was successful. In some implementations, for example, the UE 104, the TX processor 368, or the controller/processor 359 may execute the channel access assist component 140 or the APG generator 146 to transmit the APG 524 as a waveform that indicates that the LBT procedure for one or more of the indicated plurality of beams was successful. In some implementations, the APG 524 is a SRS with a sequence that indicates that the LBT procedure was successful. In some implementations, the APG 524 is transmitted outside of a COT as a contention-free transmission. In some implementations, the APG 524 is transmitted on a COT that is defined by an end of an LBT procedure performed prior to the PG and a MCOT value. In an aspect, at sub-block 932, the block 930 may include transmitting the SRS via one or more transmission ports that are each associated with a different phase shift of the sequence and a successful LBT procedure. Accordingly, each phase shift may indicate a beam associated with a successful LBT procedure. In view of the foregoing, the UE 104, the TX processor 368, or the controller/processor 359 executing the channel access assist component 140 or the APG generator 146 may provide means for transmitting an APG as a waveform that indicates that the LBT procedure for one or more of the indicated plurality of beams was successful.

At block 940, the method 900 may optionally include receiving a downlink transmission on at least one beam of the indicated plurality of beams during the COT. For instance, the block 940 may be performed in response to transmitting the APG 524. In some implementations, for example, the UE 104, the RX processor 356 or the controller/processor 359 may execute the channel access assist component 140 or the data receiver 148 to receive the downlink transmission 534 or 536 on the at least one beam during a COT 530, 532, or 540. Where the LBT procedure is an eCCA procedure, the COT 530 or 532 may be defined by the APG 524 or an agreed value and a MCOT value. In other implementations, the COT 540 is defined by an end of an LBT procedure performed prior to the PG and the MCOT value. Accordingly, the UE 104, the RX processor 356, or the controller/processor 359 executing the channel access assist component 140 or the data receiver 148 may provide means for receiving a downlink transmission on at least one beam of the indicated plurality of beams during the COT.

FIG. 10 is a flowchart of an example method 1000 for a base station to access a channel with multi-beam LBT assistance from a UE. The method 1000 may be performed by a base station (such as the base station 102, which may include the memory 376 and which may be the entire base station 102 or a component of the base station 102 such as the channel access component 120, the TX processor 316, the RX processor 370, or the controller/processor 375). The method 1000 may be performed by the channel access component 120 in communication with the channel access assist component 140 of the UE 104.

At block 1010, the method 1000 may optionally include performing a base station LBT procedure prior to transmitting the PG. In some implementations, for example, the base station 102, the RX processor 370, or the controller/processor 375 may execute the channel access component 120 or the LBT component 128 to perform a base station LBT procedure prior to transmitting the PG. The base station LBT procedure may be used to obtain a transmitter COT 540. Accordingly, the base station 102, the RX processor 370, or the controller/processor 375 executing the channel access component 120 or the LBT component 128 may provide means for performing a base station LBT procedure prior to transmitting the PG.

At block 1020, the method 1000 may include transmitting a PG indicating a plurality of beams. In some implementations, for example, base station 102, the TX processor 316, or the controller/processor 375 may execute the channel access component 120 or the PG generator 122 to transmit the PG 520 indicating the plurality of beams 512 to the UE 104. In some implementations, the PG 520 is a DCI such as the DCI 620. In some implementations, the DCI 620 is an empty grant with an invalid resource assignment or reserved MCS. In some implementations, the DCI 620 includes a field (e.g., channel access field 622) that indicates the plurality of beams based on a configured mapping of field values to sets of beams (e.g., channel access table 650). In some implementations, the configured mapping indicates a multi-beam LBT mode. In some implementations, the DCI 620 includes a CSI request field 624 that indicates a CSI resource e.g., CSI resource 664 associated with the indicated plurality of beams. In some implementations, the DCI 620 includes one or more bits (e.g., field 626) that indicate a multi-beam LBT mode. Accordingly, the base station 102, the TX processor 316, or the controller/processor 375 executing the channel access component 120 or the PG generator 122 may provide means for transmitting a PG indicating a plurality of beams to a UE.

At block 1030, the method 1000 may include receiving an APG as waveform that indicates that a LBT procedure for one or more beams of the indicated plurality of beams was successful. In some implementations, for example, the base station 102, the RX processor 370, or the controller/processor 375 may execute the channel access component 120 or the APG receiver 124 to receive the APG 524. In some implementations, the APG 524 is a SRS with a sequence that that the LBT procedure was successful. In some implementations, the APG 524 is received outside of a COT as a contention-free transmission. In some implementations, the APG 524 is received on a COT that is defined by an end of an LBT procedure performed prior to the PG and a MCOT value. In an aspect, at sub-block 1032, the block 1030 may receiving the SRS with one or more phase shifts that are each associated with one of the plurality of beams having a successful LBT procedure. Accordingly, each phase shift may indicate a beam associated with a successful LBT procedure. In view of the foregoing, the base station 102, the RX processor 370, or the controller/processor 375 executing the channel access component 120 or the LBT component 128 may provide means for receiving an APG on the transmission resource, the APG including a LBT report indicating a result of a LBT procedure for each beam of the indicated plurality of beams.

At block 1040, the method 1000 may optionally include transmitting the downlink transmission to the UE on at least one beam of the indicated plurality of beams during the COT. For example, the block 1040 may be performed in response to receiving the APG 524. The base station 102 may be allowed to transmit a downlink transmission on any of the indicated plurality of beams during the COT. In some implementations, for example, base station 102, the TX processor 316, or the controller/processor 375 may execute the channel access component 120 or the scheduler 126 to transmit the downlink transmission (e.g., DL data 534 or 536) on the at least one beam during a COT. Accordingly, the base station 102, the TX processor 316, or the controller/processor 375 executing the channel access component 120 or the PG generator 122 may provide means for transmitting a downlink transmission on at least one beam during a COT.

Some Further Example Clauses

Implementation examples are described in the following numbered clauses:

1. A method of wireless communication, comprising, at a user equipment (UE):

receiving a pre-grant (PG) indicating a plurality of beams;

performing a listen before talk (LBT) procedure on each beam of the indicated plurality of beams; and transmitting an acknowledgment to the pre-grant (APG) as a waveform that indicates that the LBT procedure for one or more of the indicated plurality of beams was successful.

2. The method of clause 1, wherein the waveform of the APG is a sounding reference signal (SRS) with a sequence that indicates that the LBT procedure was successful.

3. The method of clause 2, wherein transmitting the APG comprises transmitting the SRS via one or more transmission ports that are each associated with a different phase shift of the sequence and a successful LBT procedure.

4. The method of any of clauses 1-3, wherein a transmitter is allowed to transmit a downlink transmission on a beam of the indicated plurality of beams during a channel occupancy time (COT) based at least in part on a success of the LBT procedure corresponding to the beam.

5. The method of clause 4, further comprising receiving the downlink transmission on at least one beam of the indicated plurality of beams during the COT.

6. The method of any of clauses 1-5, wherein the LBT procedure is an extended clear channel assessment (eCCA) procedure.

7. The method of clause 6, wherein a channel occupancy time (COT) is defined by an agreed start time between an end of the PG and an end of the LBT procedure for a first beam of the plurality of beams and a maximum channel occupancy time (MCOT) value.

8. The method of clause 6, wherein a channel occupancy time (COT) is defined by a start of the APG and a maximum channel occupancy time (MCOT) value.

9. The method of any of clauses 1-5, wherein the LBT procedure is a short clear channel assessment (CCA) procedure.

10. The method of any of clauses 1-9, wherein the APG is transmitted on a COT that is defined by an end of an LBT procedure performed prior to the PG and a maximum channel occupancy time (MCOT) value.

11. The method of any of clauses 1-9, wherein the APG is transmitted outside of a channel occupancy time (COT) as a contention-free transmission.

12. The method of clause any of clauses 1-11, wherein the PG is a downlink control information (DCI).

13. The method of clause 12, wherein the DCI is an empty grant with an invalid resource assignment or reserved modulation and coding scheme (MCS).

14. The method of clause 12 or 13, wherein the DCI includes a field that indicates the plurality of beams based on a configured mapping of field values to sets of beams.

15. The method of clause 14, wherein the configured mapping indicates a multi-beam LBT mode.

16. The method of clause 12 or 13, wherein the DCI includes a channel state information (CSI) request that indicates a CSI resource associated with the indicated plurality of beams.

17. The method of clause 12 or 13, wherein the DCI includes one or more bits that indicate a multi-beam LBT mode.

18. The method of any of clauses 1-17, wherein the LBT procedure for each beam of the indicated plurality of beams follows a time division multiplexing (TDM) mode.

19. The method of any of clauses 1-17, wherein the LBT procedure for each beam of the indicated plurality of beams follows a space division multiplexing (SDM) mode.

20. The method of any of clauses 1-17, wherein performing the LBT procedure for each beam of the indicated plurality of beams comprises performing an LBT procedure on a wider beam including the plurality of beams.

21. A method of wireless communication, comprising, at a base station:

transmitting a pre-grant (PG) indicating a plurality of beams to a user equipment (UE); and receiving an acknowledgment to the pre-grant (APG) as waveform that indicates that a listen before talk (LBT) procedure for one or more beams of the indicated plurality of beams was successful.

22. The method of clause 21, wherein the waveform of the APG is a sounding reference signal (SRS) with a sequence that indicates that the LBT procedure was successful.

23. The method of clause 22, wherein receiving the APG comprises receiving the SRS with one or more phase shifts that are each associated with one of the plurality of beams having a successful LBT procedure.

24. The method of any of clauses 21-23, wherein a base station is allowed to transmit a downlink transmission on a beam of the indicated plurality of beams during a channel occupancy time (COT) based at least in part on a success of the LBT procedure corresponding to the beam.

25. The method of clause 24, further comprising transmitting the downlink transmission to the UE on at least one beam of the indicated plurality of beams during the COT.

26. The method of any of clauses 21-25, wherein the LBT procedure is an extended clear channel assessment (eCCA) procedure.

27. The method of clause 26, wherein a channel occupancy time (COT) is defined by an agreed start time between an end of the PG and an end of the LBT procedure for a first beam of the plurality of beams and a maximum channel occupancy time (MCOT) value.

28. The method of clause 26, wherein a channel occupancy time (COT) is defined by a start of the APG and a maximum channel occupancy time (MCOT) value.

29. The method of any of clauses 21-25, wherein the LBT procedure is a short clear channel assessment (CCA) procedure.

30. The method of any of clauses 21-29, wherein the APG is received on a COT that is defined by an end of an LBT procedure performed prior to the PG and a maximum channel occupancy time (MCOT) value.

31. The method of any of clauses 21-29, wherein the APG is received outside of a channel occupancy time (COT) as a contention-free transmission.

32. The method of any of clauses 21-31, wherein the PG is a downlink control information (DCI).

33. The method of clause 32, wherein the DCI is an empty grant with an invalid resource assignment or reserved modulation and coding scheme (MCS).

34. The method of clause 32 or 33, wherein the DCI includes a field that indicates the plurality of beams based on a configured mapping of field values to sets of beams.

35. The method of clause 34, wherein the configured mapping indicates a multi-beam LBT mode.

36. The method of clause 32 or 33, wherein the DCI includes a channel state information (CSI) request that indicates a CSI resource associated with the indicated plurality of beams.

37. The method of clause 32 or 33, wherein the DCI includes one or more bits that indicate a multi-beam LBT mode.

38. The method of any of clauses 21-37, wherein the LBT procedure for each beam of the indicated plurality of beams follows a time division multiplexing (TDM) mode.

39. The method of any of clauses 21-37, wherein the LBT procedure for each beam of the indicated plurality of beams follows a space division multiplexing (SDM) mode.

40. The method of any of clauses 21-37, wherein the LBT procedure for each beam of the indicated plurality of beams is performed on a wider beam including the plurality of beams.

41. An apparatus for wireless communication at a user equipment (UE), comprising:
a memory storing computer-executable instructions; and
at least one processor coupled to the memory and configured to execute the instructions to:
receive a pre-grant (PG) indicating a plurality of beams;
perform a listen before talk (LBT) procedure on each beam of the indicated plurality of beams; and
transmit an acknowledgment to the pre-grant (APG) as a waveform that indicates that the LBT procedure for one or more of the indicated plurality of beams was successful.

42. The apparatus of clause 41, wherein the waveform of the APG is a sounding reference signal (SRS) with a sequence that indicates that the LBT procedure was successful.

43. The apparatus of clause 42, wherein the at least one processor is configured to transmit the SRS via one or more transmission ports that are each associated with a different phase shift of the sequence and a successful LBT procedure.

44. The apparatus of any of any of clauses 41-43, wherein a transmitter is allowed to transmit a downlink transmission on a beam of the indicated plurality of beams during a channel occupancy time (COT) based at least in part on a success of the LBT procedure corresponding to the beam.

45. The apparatus of clause 44, wherein the at least one processor is configure to receive the downlink transmission on at least one beam of the indicated plurality of beams during the COT.

46. The apparatus of any of clauses 41-45, wherein the LBT procedure is an extended clear channel assessment (eCCA) procedure.

47. The apparatus of clause 46, wherein a channel occupancy time (COT) is defined by an agreed start time between an end of the PG and an end of the LBT procedure for a first beam of the plurality of beams and a maximum channel occupancy time (MCOT) value.

48. The apparatus of clause 46, wherein a channel occupancy time (COT) is defined by a start of the APG and a maximum channel occupancy time (MCOT) value.

49. The apparatus of any of clauses 41-45, wherein the LBT procedure is a short clear channel assessment (CCA) procedure.

50. The apparatus of any of clauses 41-49, wherein the APG is transmitted on a COT that is defined by an end of an LBT procedure performed prior to the PG and a maximum channel occupancy time (MCOT) value.

51. The apparatus of any of clauses 41-49, wherein the APG is transmitted outside of a channel occupancy time (COT) as a contention-free transmission.

52. The apparatus of any of clauses 41-51, wherein the PG is a downlink control information (DCI).

53. The apparatus of clause 52, wherein the DCI is an empty grant with an invalid resource assignment or reserved modulation and coding scheme (MCS).

54. The apparatus of clause 52 or 53, wherein the DCI includes a field that indicates the plurality of beams based on a configured mapping of field values to sets of beams.

55. The apparatus of clause 54, wherein the configured mapping indicates a multi-beam LBT mode.

56. The apparatus of clause 52 or 53, wherein the DCI includes a channel state information (CSI) request that indicates a CSI resource associated with the indicated plurality of beams.

57. The apparatus of clause 52, wherein the DCI includes one or more bits that indicate a multi-beam LBT mode.

58. The apparatus of any of clauses 41-57, wherein the LBT procedure for each beam of the indicated plurality of beams follows a time division multiplexing (TDM) mode.

59. The apparatus of any of any of clauses 41-57, wherein the LBT procedure for each beam of the indicated plurality of beams follows a space division multiplexing (SDM) mode.

60. The apparatus of any of any of clauses 41-57, wherein the at least one processor is configure to perform an LBT procedure on a wider beam including the plurality of beams.

61. An apparatus for wireless communication at a base station, comprising:
a memory storing computer-executable instructions; and
at least one processor coupled to the memory and configured to execute the instructions to:
transmit a pre-grant (PG) indicating a plurality of beams to a user equipment (UE); and
receive an acknowledgment to the pre-grant (APG) as waveform that indicates that a listen before talk (LBT) procedure for one or more beams of the indicated plurality of beams was successful.

62. The apparatus of clause 61, wherein the waveform of the APG is a sounding reference signal (SRS) with a sequence that indicates that the LBT procedure was successful.

63. The apparatus of clause 62, wherein the at least one processor is configure to receive the SRS with one or more phase shifts that are each associated with one of the plurality of beams having a successful LBT procedure.

64. The apparatus of any of clauses 61-63, wherein a base station is allowed to transmit a downlink transmission on a beam of the indicated plurality of beams during a channel occupancy time (COT) based at least in part on a success of the LBT procedure corresponding to the beam.

65. The apparatus of clause 64, wherein the at least one processor is configure to transmit the downlink transmission to the UE on at least one beam of the indicated plurality of beams during the COT.

66. The apparatus of any of clauses 61-65, wherein the LBT procedure is an extended clear channel assessment (eCCA) procedure.

67. The apparatus of clause 66, wherein a channel occupancy time (COT) is defined by an agreed start time between an end of the PG and an end of the LBT procedure for a first beam of the plurality of beams and a maximum channel occupancy time (MCOT) value.

68. The apparatus of clause 66, wherein a channel occupancy time (COT) is defined by a start of the APG and a maximum channel occupancy time (MCOT) value.

69. The apparatus of any of clauses 61-63, wherein the LBT procedure is a short clear channel assessment (CCA) procedure.

70. The apparatus of any of clauses 61-69, wherein the APG is received on a COT that is defined by an end of an LBT procedure performed prior to the PG and a maximum channel occupancy time (MCOT) value.

71. The apparatus of any of clauses 61-69, wherein the APG is received outside of a channel occupancy time (COT) as a contention-free transmission.

72. The apparatus of any of clauses 61-71, wherein the PG is a downlink control information (DCI).

73. The apparatus of clause 71, wherein the DCI is an empty grant with an invalid resource assignment or reserved modulation and coding scheme (MCS).

74. The apparatus of clause 71 or 72, wherein the DCI includes a field that indicates the plurality of beams based on a configured mapping of field values to sets of beams.

75. The apparatus of clause 74, wherein the configured mapping indicates a multi-beam LBT mode.

76. The apparatus of clause 71 or 72, wherein the DCI includes a channel state information (CSI) request that indicates a CSI resource associated with the indicated plurality of beams.

77. The apparatus of clause 71 or 72, wherein the DCI includes one or more bits that indicate a multi-beam LBT mode.

78. The apparatus of any of clauses 61-77, wherein the LBT procedure for each beam of the indicated plurality of beams follows a time division multiplexing (TDM) mode.

79. The apparatus of any of clauses 61-77, wherein the LBT procedure for each beam of the indicated plurality of beams follows a space division multiplexing (SDM) mode.

80. The apparatus of any of clauses 61-77, wherein the LBT procedure for each beam of the indicated plurality of beams is performed on a wider beam including the plurality of beams.

81. An apparatus for wireless communication at a user equipment (UE), comprising:

means for receiving a pre-grant (PG) indicating a plurality of beams;

means for performing a listen before talk (LBT) procedure on each beam of the indicated plurality of beams; and means for transmitting an acknowledgment to the pre-grant (APG) as a waveform that indicates that the LBT procedure for one or more of the indicated plurality of beams was successful.

82. The apparatus of clause 81, wherein the waveform of the APG is a sounding reference signal (SRS) with a sequence that indicates that the LBT procedure was successful.

83. The apparatus of clause 82, wherein the means for transmitting the APG is configured to transmit the SRS via one or more transmission ports that are each associated with a different phase shift of the sequence and a successful LBT procedure.

84. The apparatus of any of clauses 81-83, wherein a transmitter is allowed to transmit a downlink transmission on a beam of the indicated plurality of beams during a channel occupancy time (COT) based at least in part on a success of the LBT procedure corresponding to the beam.

85. The apparatus of clause 84, further comprising means for receiving the downlink transmission on at least one beam of the indicated plurality of beams during the COT.

86. The apparatus of any of clauses 81-85, wherein the LBT procedure is an extended clear channel assessment (eCCA) procedure.

87. The apparatus of clause 86, wherein a channel occupancy time (COT) is defined by an agreed start time between an end of the PG and an end of the LBT procedure for a first beam of the plurality of beams and a maximum channel occupancy time (MCOT) value.

88. The apparatus of clause 86, wherein a channel occupancy time (COT) is defined by a start of the APG and a maximum channel occupancy time (MCOT) value.

89. The apparatus of any of clauses 81-85, wherein the LBT procedure is a short clear channel assessment (CCA) procedure.

90. The apparatus of any of clauses 81-89, wherein the APG is transmitted on a COT that is defined by an end of an LBT procedure performed prior to the PG and a maximum channel occupancy time (MCOT) value.

91. The apparatus of any of clauses 81-89, wherein the APG is transmitted outside of a channel occupancy time (COT) as a contention-free transmission.

92. The apparatus of any of clauses 81-91, wherein the PG is a downlink control information (DCI).

93. The apparatus of clause 92, wherein the DCI is an empty grant with an invalid resource assignment or reserved modulation and coding scheme (MCS).

94. The apparatus of clause 92 or 93, wherein the DCI includes a field that indicates the plurality of beams based on a configured mapping of field values to sets of beams.

95. The apparatus of clause 94, wherein the configured mapping indicates a multi-beam LBT mode.

96. The apparatus of clause 92 or 93, wherein the DCI includes a channel state information (CSI) request that indicates a CSI resource associated with the indicated plurality of beams.

97. The apparatus of clause 92 or 93, wherein the DCI includes one or more bits that indicate a multi-beam LBT mode.

98. The apparatus of any of clauses 81-97, wherein the LBT procedure for each beam of the indicated plurality of beams follows a time division multiplexing (TDM) mode.

99. The apparatus of any of clauses 81-97, wherein the LBT procedure for each beam of the indicated plurality of beams follows a space division multiplexing (SDM) mode.

100. The apparatus of any of clauses 81-97, wherein the means for performing the LBT procedure for each beam of the indicated plurality of beams is configured to perform an LBT procedure on a wider beam including the plurality of beams.

101. An apparatus for wireless communication at a base station, comprising:

means for transmitting a pre-grant (PG) indicating a plurality of beams to a user equipment (UE); and means for receiving an acknowledgment to the pre-grant (APG) as waveform that indicates that a listen before talk (LBT) procedure for one or more beams of the indicated plurality of beams was successful.

102. The apparatus of clause 101, wherein the waveform of the APG is a sounding reference signal (SRS) with a sequence that indicates that the LBT procedure was successful.

103. The apparatus of clause 102, wherein the means for receiving the APG is configured to receive the SRS with one or more phase shifts that are each associated with one of the plurality of beams having a successful LBT procedure.

104. The apparatus of any of clauses 101-103, wherein a base station is allowed to transmit a downlink transmission on a beam of the indicated plurality of beams during a channel occupancy time (COT) based at least in part on a success of the LBT procedure corresponding to the beam.

105. The apparatus of clause 104, further comprising means for transmitting the downlink transmission to the UE on at least one beam of the indicated plurality of beams during the COT.

106. The apparatus of any of clauses 101-105, wherein the LBT procedure is an extended clear channel assessment (eCCA) procedure.

107. The apparatus of clause 106, wherein a channel occupancy time (COT) is defined by an agreed start time between an end of the PG and an end of the LBT procedure for a first beam of the plurality of beams and a maximum channel occupancy time (MCOT) value.

108. The apparatus of clause 106, wherein a channel occupancy time (COT) is defined by a start of the APG and a maximum channel occupancy time (MCOT) value.

109. The apparatus of any of clauses 101-105, wherein the LBT procedure is a short clear channel assessment (CCA) procedure.

110. The apparatus of any of clauses 101-109, wherein the APG is received on a COT that is defined by an end of an LBT procedure performed prior to the PG and a maximum channel occupancy time (MCOT) value.

111. The apparatus of any of clauses 101-109, wherein the APG is received outside of a channel occupancy time (COT) as a contention-free transmission.

112. The apparatus of any of clauses 101-111, wherein the PG is a downlink control information (DCI).

113. The apparatus of clause 112, wherein the DCI is an empty grant with an invalid resource assignment or reserved modulation and coding scheme (MCS).

114. The apparatus of clause 112 or 113, wherein the DCI includes a field that indicates the plurality of beams based on a configured mapping of field values to sets of beams.

115. The apparatus of clause 114, wherein the configured mapping indicates a multi-beam LBT mode.

116. The apparatus of clause 112 or 113, wherein the DCI includes a channel state information (CSI) request that indicates a CSI resource associated with the indicated plurality of beams.

117. The apparatus of clause 112 or 113, wherein the DCI includes one or more bits that indicate a multi-beam LBT mode.

118. The apparatus of any of clauses 101-117, wherein the LBT procedure for each beam of the indicated plurality of beams follows a time division multiplexing (TDM) mode.

119. The apparatus of any of clauses 101-117, wherein the LBT procedure for each beam of the indicated plurality of beams follows a space division multiplexing (SDM) mode.

120. The apparatus of any of clauses 101-117, wherein the LBT procedure for each beam of the indicated plurality of beams is performed on a wider beam including the plurality of beams.

121. A non-transitory computer-readable medium storing computer executable code, the code when executed by a processor of a user equipment (UE) instructs the processor to:

receive a pre-grant (PG) indicating a plurality of beams;
    perform a listen before talk (LBT) procedure on each beam of the indicated plurality of beams; and
    transmit an acknowledgment to the pre-grant (APG) as a waveform that indicates that the LBT procedure for one or more of the indicated plurality of beams was successful.

122. The non-transitory computer-readable medium of clause 121, wherein the waveform of the APG is a sounding reference signal (SRS) with a sequence that indicates that the LBT procedure was successful.

123. The non-transitory computer-readable medium of clause 122, wherein the code to transmit the APG comprises code to transmit the SRS via one or more transmission ports that are each associated with a different phase shift of the sequence and a successful LBT procedure.

124. The non-transitory computer-readable medium of any of clauses 121-123, wherein a transmitter is allowed to transmit a downlink transmission on a beam of the indicated plurality of beams during a channel occupancy time (COT) based at least in part on a success of the LBT procedure corresponding to the beam.

125. The non-transitory computer-readable medium of clause 124, further comprising code to receive the downlink transmission on at least one beam of the indicated plurality of beams during the COT.

126. The non-transitory computer-readable medium of any of clauses 121-125, wherein the LBT procedure is an extended clear channel assessment (eCCA) procedure.

127. The non-transitory computer-readable medium of clause 126, wherein a channel occupancy time (COT) is defined by an agreed start time between an end of the PG and an end of the LBT procedure for a first beam of the plurality of beams and a maximum channel occupancy time (MCOT) value.

128. The non-transitory computer-readable medium of clause 126, wherein a channel occupancy time (COT) is defined by a start of the APG and a maximum channel occupancy time (MCOT) value.

129. The non-transitory computer-readable medium of any of clauses 121-125, wherein the LBT procedure is a short clear channel assessment (CCA) procedure.

130. The non-transitory computer-readable medium of any of clauses 121-129, wherein the APG is transmitted on a COT that is defined by an end of an LBT procedure performed prior to the PG and a maximum channel occupancy time (MCOT) value.

131. The non-transitory computer-readable medium of any of clauses 121-129, wherein the APG is transmitted outside of a channel occupancy time (COT) as a contention-free transmission.

132. The non-transitory computer-readable medium of any of clauses 121-131, wherein the PG is a downlink control information (DCI).

133. The non-transitory computer-readable medium of clause 132, wherein the DCI is an empty grant with an invalid resource assignment or reserved modulation and coding scheme (MCS).

134. The non-transitory computer-readable medium of clause 132 or 133, wherein the DCI includes a field that indicates the plurality of beams based on a configured mapping of field values to sets of beams.

135. The non-transitory computer-readable medium of clause 134, wherein the configured mapping indicates a multi-beam LBT mode.

136. The non-transitory computer-readable medium of clause 132 or 133, wherein the DCI includes a channel state information (CSI) request that indicates a CSI resource associated with the indicated plurality of beams.

137. The non-transitory computer-readable medium of clause 132 or 133, wherein the DCI includes one or more bits that indicate a multi-beam LBT mode.

138. The non-transitory computer-readable medium of any of clauses 121-137, wherein the LBT procedure for each beam of the indicated plurality of beams follows a time division multiplexing (TDM) mode.

139. The non-transitory computer-readable medium of any of clauses 121-137, wherein the LBT procedure for each beam of the indicated plurality of beams follows a space division multiplexing (SDM) mode.

140. The non-transitory computer-readable medium of any of clauses 121-137, wherein the code to perform the LBT procedure for each beam of the indicated plurality of beams comprises code to perform an LBT procedure on a wider beam including the plurality of beams.

141. A non-transitory computer-readable medium storing computer executable code, the code when executed by a processor of a base station instructs the processor to:

transmit a pre-grant (PG) indicating a plurality of beams to a user equipment (UE); and receive an acknowledgment to the pre-grant (APG) as waveform that indicates that a listen before talk (LBT) procedure for one or more beams of the indicated plurality of beams was successful.

142. The non-transitory computer-readable medium of clause 141, wherein the waveform of the APG is a sounding reference signal (SRS) with a sequence that indicates that the LBT procedure was successful.

143. The non-transitory computer-readable medium of clause 142, wherein the code to receive the APG comprises code to receive the SRS with one or more phase shifts that are each associated with one of the plurality of beams having a successful LBT procedure.

144. The non-transitory computer-readable medium of any of clauses 141-143, wherein a base station is allowed to transmit a downlink transmission on a beam of the indicated plurality of beams during a channel occupancy time (COT) based at least in part on a success of the LBT procedure corresponding to the beam.

145. The non-transitory computer-readable medium of clause 144, further comprising code to transmit the downlink transmission to the UE on at least one beam of the indicated plurality of beams during the COT.

146. The non-transitory computer-readable medium of any of clauses 141-145, wherein the LBT procedure is an extended clear channel assessment (eCCA) procedure.

147. The non-transitory computer-readable medium of clause 146, wherein a channel occupancy time (COT) is defined by an agreed start time between an end of the PG and an end of the LBT procedure for a first beam of the plurality of beams and a maximum channel occupancy time (MCOT) value.

148. The non-transitory computer-readable medium of clause 146, wherein a channel occupancy time (COT) is defined by a start of the APG and a maximum channel occupancy time (MCOT) value.

149. The non-transitory computer-readable medium of any of clauses 141-145, wherein the LBT procedure is a short clear channel assessment (CCA) procedure.

150. The non-transitory computer-readable medium of any of clauses 141-149, wherein the APG is received on a COT that is defined by an end of an LBT procedure performed prior to the PG and a maximum channel occupancy time (MCOT) value.

151. The non-transitory computer-readable medium of any of clauses 141-149, wherein the APG is received outside of a channel occupancy time (COT) as a contention-free transmission.

152. The non-transitory computer-readable medium of any of clauses 141-151, wherein the PG is a downlink control information (DCI).

153. The non-transitory computer-readable medium of clause 152, wherein the DCI is an empty grant with an invalid resource assignment or reserved modulation and coding scheme (MCS).

154. The non-transitory computer-readable medium of clause 152 or 153, wherein the DCI includes a field that indicates the plurality of beams based on a configured mapping of field values to sets of beams.

155. The non-transitory computer-readable medium of clause 154, wherein the configured mapping indicates a multi-beam LBT mode.

156. The non-transitory computer-readable medium of clause 152 or 153, wherein the DCI includes a channel state information (CSI) request that indicates a CSI resource associated with the indicated plurality of beams.

157. The non-transitory computer-readable medium of clause 152 or 153, wherein the DCI includes one or more bits that indicate a multi-beam LBT mode.

158. The non-transitory computer-readable medium of any of clauses 141-157, wherein the LBT procedure for each beam of the indicated plurality of beams follows a time division multiplexing (TDM) mode.

159. The non-transitory computer-readable medium of any of clauses 141-157, wherein the LBT procedure for each beam of the indicated plurality of beams follows a space division multiplexing (SDM) mode.

160. The non-transitory computer-readable medium of any of clauses 141-157, wherein the LBT procedure for each beam of the indicated plurality of beams is performed on a wider beam including the plurality of beams.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising, at a user equipment (UE):
   receiving a pre-grant (PG) indicating a plurality of beams;
   performing a listen before talk (LBT) procedure on each beam of the indicated plurality of beams; and
   transmitting an acknowledgment to the pre-grant (APG) as a sounding reference signal (SRS) with a sequence that indicates that the LBT procedure for one or more of the indicated plurality of beams was successful, wherein transmitting the APG comprises transmitting the SRS via one or more transmission ports that are each associated with a different phase shift of the sequence and a successful LBT procedure.

2. The method of claim 1, wherein a transmitter is allowed to transmit a downlink transmission on a beam of the indicated plurality of beams during a channel occupancy time (COT) based at least in part on a success of the LBT procedure corresponding to the beam.

3. The method of claim 2, further comprising receiving the downlink transmission on at least one beam of the indicated plurality of beams during the COT.

4. The method of claim 1, wherein the LBT procedure is an extended clear channel assessment (eCCA) procedure or a short clear channel assessment (CCA) procedure.

5. The method of claim 1, wherein the APG is transmitted on a COT that is defined by an end of an LBT procedure performed prior to the PG and a maximum channel occupancy time (MCOT) value.

6. The method of claim 1, wherein the APG is transmitted outside of a channel occupancy time (COT) as a contention-free transmission.

7. The method of claim 1, wherein the PG is a downlink control information (DCI).

8. The method of claim 7, wherein the DCI includes one of:
   an empty grant with an invalid resource assignment or reserved modulation and coding scheme (MCS);
   a field that indicates the plurality of beams based on a configured mapping of field values to sets of beams;
   a channel state information (CSI) request that indicates a CSI resource associated with the indicated plurality of beams; or
   one or more bits that indicate a multi-beam LBT mode.

9. The method of claim 1, wherein the LBT procedure for each beam of the indicated plurality of beams follows a time division multiplexing (TDM) mode or a space division multiplexing (SDM) mode.

10. The method of claim 1, wherein performing the LBT procedure for each beam of the indicated plurality of beams comprises performing an LBT procedure on a wider beam including the plurality of beams.

11. A method of wireless communication, comprising, at a base station:

transmitting a pre-grant (PG) indicating a plurality of beams to a user equipment (UE); and receiving an acknowledgment to the pre-grant (APG) as a sounding reference signal (SRS) with a sequence that indicates that a listen before talk (LBT) procedure for one or more beams of the indicated plurality of beams was successful, wherein receiving the APG comprises receiving the SRS with one or more phase shifts that are each associated with one of the plurality of beams having a successful LBT procedure.

12. The method of claim 11, wherein a base station is allowed to transmit a downlink transmission on a beam of the indicated plurality of beams during a channel occupancy time (COT) based at least in part on a success of the LBT procedure corresponding to the beam.

13. The method of claim 11, wherein the LBT procedure is an extended clear channel assessment (eCCA) procedure or is a short clear channel assessment (CCA) procedure.

14. The method of claim 11, wherein the APG is received on a COT that is defined by an end of an LBT procedure performed prior to the PG and a maximum channel occupancy time (MCOT) value.

15. The method of claim 11, wherein the APG is received outside of a channel occupancy time (COT) as a contention-free transmission.

16. The method of claim 11, wherein the PG is a downlink control information (DCI).

17. The method of claim 16, wherein the DCI includes one of:

an empty grant with an invalid resource assignment or reserved modulation and coding scheme (MCS);

a field that indicates the plurality of beams based on a configured mapping of field values to sets of beams;

a channel state information (CSI) request that indicates a CSI resource associated with the indicated plurality of beams; or one or more bits that indicate a multi-beam LBT mode.

18. An apparatus for wireless communication at a user equipment (UE), comprising:

a memory storing computer-executable instructions; and at least one processor coupled to the memory and configured to execute the instructions to:

receive a pre-grant (PG) indicating a plurality of beams;

perform a listen before talk (LBT) procedure on each beam of the indicated plurality of beams; and transmit an acknowledgment to the pre-grant (APG) as a sounding reference signal (SRS) with a sequence that indicates that the LBT procedure for one or more of the indicated plurality of beams was successful, wherein to transmit the APG, the at least one processor is configured to execute the instructions to transmit the SRS via one or more transmission ports that are each associated with a different phase shift of the sequence and a successful LBT procedure.

* * * * *